(12) United States Patent
Perlingeiro et al.

(10) Patent No.: US 12,529,033 B2
(45) Date of Patent: Jan. 20, 2026

(54) METHOD OF ISOLATING MYOGENIC PROGENITORS USING CD54

(71) Applicant: Regents of the University of Minnesota, Minneapolis, MN (US)

(72) Inventors: Rita Perlingeiro, St. Paul, MN (US); Alessandro Magli, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 353 days.

(21) Appl. No.: 16/461,533

(22) PCT Filed: Nov. 17, 2017

(86) PCT No.: PCT/US2017/062300
§ 371 (c)(1),
(2) Date: May 16, 2019

(87) PCT Pub. No.: WO2018/094209
PCT Pub. Date: May 24, 2018

(65) Prior Publication Data
US 2019/0352611 A1    Nov. 21, 2019

Related U.S. Application Data

(60) Provisional application No. 62/424,356, filed on Nov. 18, 2016.

(51) Int. Cl.
C12N 5/00     (2006.01)
A61K 35/34    (2015.01)
C12N 5/077    (2010.01)

(52) U.S. Cl.
CPC ............ *C12N 5/0658* (2013.01); *A61K 35/34* (2013.01); *C12N 2501/115* (2013.01); *C12N 2501/727* (2013.01); *C12N 2501/999* (2013.01); *C12N 2506/02* (2013.01); *C12N 2533/54* (2013.01)

(58) Field of Classification Search
CPC ............ C12N 5/0658; C12N 2501/115; C12N 2501/727; C12N 2501/999; C12N 2506/02; C12N 2533/54; A61K 35/34
See application file for complete search history.

(56) References Cited

U.S. PATENT DOCUMENTS 9,085,755 B2 *   7/2015  Phan ........................ A61P 3/10
2010/0247495 A1   9/2010  Ichim et al.
2015/0037436 A1*  2/2015  Huang ................ A61L 27/3604
                                               424/574

FOREIGN PATENT DOCUMENTS

WO    WO-96/39035 A1      12/1996
WO    WO-2005084119 A2    9/2005
WO    WO-2006/037649 A1   4/2006
WO    WO-2014/113704 A2   7/2014
WO    WO-2018094209 A1    5/2018

OTHER PUBLICATIONS

Lafuste et al. ("ADAM12 and Integrin Are Instrumental in Human Myogenic Cell Differentiation," Molecular Biology of the Cell, vol. 16, 861-870, Feb. 2005).*
Darabi et al ("Human ES- and iPS-Derived Myogenic Progenitors Restore Dystrophin and Improve Contractility upon Transplantation in Dystrophic Mice," Cell Stem Cell 10, 610-619, May 4, 2012.*
Do et al ("Transmembrane proteoglycans syndecan-2,4, receptor candidates for the impact of HGF and FGF2 on semaphorin 3A expression in early-differentiated myoblasts," Physiol Rep, 3(9), 2015).*
Abjujarour et al ("Generation of skeletal muscle cells from pluripotent stem cells: advances and challenges," Front. Cell Dev. Biol 3: 29 2015).*
Darabi et al (Human ES- and iPS-Derived Myogenic Progenitors Restore Dystrophin and Improve Contractility upon Transplantation in Dystrophic Mice, Cell Stem Cell 10, 610-619, May 4, 2012), Supplemental Information (Year: 2012).*
Barberi et al ("Derivation of engraftable skeletal myoblasts from human embryonic stem cells," Nature Medicine 13(5):642-648 (2005)) (Year: 2005).*
Chal ("Differentiation of pluripotent stem cells to muscle fiber to model Duchenne muscular dystrophy," Nature Biotechnology vol. 33 No. 9 Sep. 2015) (Year: 2015).*
Dearth et al ("Skeletal Muscle Cells Express ICAM-1 after Muscle Overload and ICAM-1 Contributes to the Ensuing Hypertrophic Response," PLOS ONE Mar. 2013 | vol. 8 | Issue 3) (Year: 2013).*
"International Application Serial No. PCT/US2017/062300, International Search Report mailed Feb. 2, 2018", 5 pgs.
"International Application Serial No. PCT/US2017/062300, Written Opinion mailed Feb. 2, 2018", 8 pgs.
De Ugarte, et al., "Differential Expression of Stem Cell Mobilization-Associated Molecules on Multi-Lineage Cells from Adipose Tissue and Bone Marrow", Immunology Letters 89, (2003), 267-270.
Elvira, Carrio, et al., "Muscle cell identity requires Pax7-mediated lineage-specific DNA demethylation", Bmc Biology vol. 14, No. 1, (Apr. 13, 2016).
Magli, Alessandro, et al., "Myogenic progenitor specification from pluripotent stem cells", Seminars in Cell and Developmental Biology Academic Press GB vol. 72, (Dec. 5, 2017), 87-98.
Magli, Alessandro, et al., "PAX7 Targets CD54, Integrin [alpha]9[Beta]1 and SDC2 Allow Isolation of Human ESC/iPSC-Derived Myogenic Progenitors", Cell Reports, 19, (2017), 2867-2877.
Peggy, Lafuste, et al., "ADAM12 and_9?1 Integrin Are Instrumental in Human Myogenic Cell Differentiation", Molecular Biology of the Cell, (Dec. 1, 2004), 861-870.
Ramzey, Abujarour, et al., "Generation of skeletal muscle cells from pluripotent stem cells advances and challenges", Frontiers in Cell and Developmental Biology vol. 13, (May 13, 2015).
"International Application Serial No. PCT/US2017/062300, International Preliminary Report on Patentability mailed May 31, 2019", 10 pgs.
Castiglioni, Alessandra, "Isolation of Progenitors that Exhibit Myogenic/Osteogenic Bipotency In Vitro by Fluorescence-Activated Cell Sorting from Human Fetal Muscle", *Stem Cell Reports*, vol. 2, (2014), 92-106.

(Continued)

*Primary Examiner* — Michael C Wilson
(74) *Attorney, Agent, or Firm* — Fish & Richardson P.C.

(57) ABSTRACT

Provided herein are isolated myogenic progenitor cells, methods to isolate myogenic progenitor cells and method of their use.

7 Claims, 9 Drawing Sheets

(56) References Cited

OTHER PUBLICATIONS

Do, Mai-Khoi Q., et al., "Transmembrane proteoglycans syndecan-2, 4, receptor candidates for the impact of HGF and FGF2 on semaphorin 3A expression in early-differentiated myoblasts", *Physiology Reports*, 3(9): e12553, (2015), 1-14.
Gearhart, J., et al., "New potential for human embryonic stem cells", *Science*, 282(5391), (1998), 1061-1062.
Ooishi, Ryo, et al., "Microphthalmia-associated transcription factor is required for mature myotube formation", *Biochimica et Biophysica Acta (BBA)—General Subjects*, 1820(2), (Feb. 2012), 76-83.
Thomson, James A., et al., "Embryonic Stem Cell Lines Derived From Human Blastocysts", *Science*, 282(5391), (Nov. 6, 1998), 1145-1147.
"The Myogenic Regenerative Potential of ES and iPS Cells", In: Myology 2011, 4th International Congress of Myology, Lille, France, (2011), 2 pgs.
Arpke et al., "A new immuno-, dystrophin-deficient model, the NSG-mdx(4Cv) mouse, provides evidence for functional improvement following allogeneic satellite cell transplantation," Stem Cells, Aug. 2013, 31(8):1611-1620.
Bajard et al., "A novel genetic hierarchy functions during hypaxial myogenesis: Pax3 directly activates Myf5 in muscle progenitor cells in the limb," Genes Dev., Sep. 2006, 20(17):2450-2464.
Bernet et al., "p38 MAPK signaling underlies a cell-autonomous loss of stem cell self-renewal in skeletal muscle of aged mice," Nat. Med., Mar. 2014, 20(3):265-271.
Borchin et al., "Derivation and FACS-mediated purification of PAX3+/PAX7+ skeletal muscle precursors from human pluripotent stem cells," Stem Cell Reports, Nov. 2013, 1(6):620-631.
Boyer et al., "Core transcriptional regulatory circuitry in human embryonic stem cells," Cell, Sep. 2005, 122(6):947-956.
Carpenter et al., "Concise review: making and using clinically compliant pluripotent stem cell lines," Stem Cells Transl. Med., Apr. 2015, 4(4):381-388.
Chal et al., "Generation of human muscle fibers and satellite-like cells from human pluripotent stem cells in vitro," Nat. Protoc., Oct. 2016, 11(10):1833-1850.
Choi et al., "Concordant but Varied Phenotypes among Duchenne Muscular Dystrophy Patient-Specific Myoblasts Derived using a Human iPSC-Based Model," Cell Rep., Jun. 2016, 15(10):2301-2312.
Cooper et al., "In vivo satellite cell activation via Myf5 and MyoD in regenerating mouse skeletal muscle," J. Cell Sci., Sep. 1999, 112(Pt. 17):2895-2901.
Cosgrove et al., "Rejuvenation of the muscle stem cell population restores strength to injured aged muscles," Nat. Med., Mar. 2014, 20(3):255-264.
Darabi et al., "Assessment of the myogenic stem cell compartment following transplantation of Pax3/Pax7-induced embryonic stem cell-derived progenitors," Stem Cells, May 2011, 29(5):777-790.
Darabi et al., "Derivation of Skeletal Myogenic Precursors from Human Pluripotent Stem Cells Using Conditional Expression of PAX7," Methods Mol. Biol., 2016, 1357:423-439.
Darabi et al., "Functional myogenic engraftment from mouse iPS cells," Stem Cell Rev. Rep., Nov. 2011, 7(4):948-957.
Darabi et al., "Functional skeletal muscle regeneration from differentiating embryonic stem cells," Nat. Med., Feb. 2008, 14(2):134-143.
Donalies et al., "Expression of M-cadherin, a member of the cadherin multigene family, correlates with differentiation of skeletal muscle cells," Proc. Natl. Acad. Sci. U.S.A., Sep. 1991, 88(18):8024-8028.
Dumont et al., "Intrinsic and extrinsic mechanisms regulating satellite cell function," Development, May 2015, 142(9):1572-1581.
Emery, "The muscular dystrophies," Lancet, Feb. 2002, 359(9307):687-695.
Epstein et al., "Pax3 modulates expression of the c-Met receptor during limb muscle development," Proc. Natl. Acad. Sci. U.S.A., Apr. 1996, 93(9):4213-4218.
Filareto et al., "An ex vivo gene therapy approach to treat muscular dystrophy using inducible pluripotent stem cells," Nat. Commun., 2013, 4:1549, 9 pages.
Filareto et al., "Engraftment of ES-Derived Myogenic Progenitors in a Severe Mouse Model of Muscular Dystrophy," J. Stem Cell Res. Ther., Jan. 2012, 10(1):S10-001.
Gene Expression Omnibus Accession No. GSE90876, "Transcriptomic Profiling of Developing Human Paraxial Mesoderm from 4.5-5 Weeks of Gestation Human Embryos," May 2019, 2 pages.
Gene Expression Omnibus Accession No. GSE98976, "Identification of PAX7-induced transcriptional changes and PAX7 genomic binding during skeletal myogenic differentiation of H9 embryonic stem cells," Jul. 2021, 2 pages.
Gilbert et al., "Substrate Elasticity Regulates Skeletal Muscle Stem Cell Self-Renewal in Culture," Science, Jul. 2010, 329(5995):1078-1081.
Huard et al., "Myoblast transplantation produced dystrophin-positive muscle fibres in a 16-year-old patient with Duchenne muscular dystrophy," Clin. Sci. (Lond)., Aug. 1991, 81(2):287-288.
Irintchev et al., "Expression pattern of M-cadherin in normal, denervated, and regenerating mouse muscles," Dev. Dyn., Apr. 1994, 199(4):326-337.
Kim et al., "Expansion and Purification Are Critical for the Therapeutic Application of Pluripotent Stem Cell-Derived Myogenic Progenitors," Stem Cell Reports, Jul. 2017, 9(1):12-22.
Le Moal et al., "Redox Control of Skeletal Muscle Regeneration," Antioxid. Redox Signal, Aug. 2017, 27(5):276-310.
Magli et al., "Functional dissection of Pax3 in paraxial mesoderm development and myogenesis," Stem Cells, Jan. 2013, 31(1):59-70.
Magli et al., "Pax3 and Tbx5 specify whether PDGFRα+ cells assume skeletal or cardiac muscle fate in differentiating embryonic stem cells," Stem Cells, Aug. 2014, 32(8):2072-2083.
Mendell et al., "Myoblast transfer in the treatment of Duchenne's muscular dystrophy," N. Engl. J. Med., Sep. 1995, 333(13):832-838.
Mitchell et al., "Identification and characterization of a non-satellite cell muscle resident progenitor during postnatal development," Nat. Cell Biol., Mar. 2010, 12(3):257-266.
Nalbandian et al., "Characterization of hiPSC-Derived Muscle Progenitors Reveals Distinctive Markers for Myogenic Cell Purification Toward Cell Therapy," Stem Cell Reports, Apr. 2021, 16(4):883-898.
Partridge et al., "Conversion of mdx myofibres from dystrophin-negative to -positive by injection of normal myoblasts," Nature, Jan. 1989, 337(6203):176-179.
Partridge et al., "Is myoblast transplantation effective?" Nat. Med., Nov. 1998, 4(11):1208-1209.
Quarta et al., "An artificial niche preserves the quiescence of muscle stem cells and enhances their therapeutic efficacy," Nat. Biotechnol., Jul. 2016, 34(7):752-759.
Sampaolesi et al., "Cell Therapy of α-Sarcoglycan Null Dystrophic Mice through Intra-Arterial Delivery of Mesoangioblasts," Science, Jul. 2003, 301(5632):487-492.
Seale et al., "Pax7 is required for the specification of myogenic satellite cells," Cell, Sep. 2000, 102(6):777-786.
Shelton et al., "Derivation and Expansion of PAX7-Positive Muscle Progenitors from Human and Mouse Embryonic Stem Cells," Stem Cell Reports, Sep. 2014, 3(3):516-529.
Soleimani et al., "Transcriptional dominance of Pax7 in adult myogenesis is due to high-affinity recognition of homeodomain motifs," Dev. Cell, Jun. 2012, 22(6):1208-1220.
Sousa-Victor et al., "Geriatric muscle stem cells switch reversible quiescence into senescence," Nature, Feb. 2014, 506(7488):316-321.
Takahashi et al., "Induction of Pluripotent Stem Cells from Mouse Embryonic and Adult Fibroblast Cultures by Defined Factors," Cell, Aug. 2006, 126(4):663-676.
Tedesco et al., "Stem cell therapies for muscle disorders," Curr. Opin. Neurol., Oct. 2012, 25(5):597-603.

(56) References Cited

OTHER PUBLICATIONS

Torrente et al., "Human circulating AC133(+) stem cells restore dystrophin expression and ameliorate function in dystrophic skeletal muscle," J. Clin. Invest., Jul. 2004, 114(2):182-195.
Tremblay et al., "Results of a triple blind clinical study of myoblast transplantations without immunosuppressive treatment in young boys with Duchenne muscular dystrophy," Cell Transplant., Mar.-Apr. 1993, 2(2):99-112.
Vilquin, "Myoblast transplantation: clinical trials and perspectives. Mini-review," Acta. Myol., Oct. 2005, 24(2):119-127.
Xu et al., "A Zebrafish Embryo Culture System Defines Factors that Promote Vertebrate Myogenesis across Species," Cell, Nov. 2013, 155(4):909-921.

\* cited by examiner

METHOD OF ISOLATING MYOGENIC PROGENITORS USING CD54

PRIORITY

This application is a U.S. National Stage Filing under 35 U.S.C. § 371 from International Application No. PCT/US2017/062300, filed Nov. 17, 2017, and published as WO 2018/094290 A1 on May 24, 2018, which claims the benefit of priority from U.S. Provisional Patent Application No. 62/424,356, filed Nov. 18, 2016, which is herein incorporated in its entirety by reference.

GOVERNMENT GRANT SUPPORT

This invention was made with government support under R01 AR055299 awarded by the National Institutes of Health. The government has certain rights in the invention.

BACKGROUND OF THE INVENTION

Muscular dystrophies are a heterogeneous group of diseases characterized by loss of the normal muscle fiber structure often associated by its replacement with fibrotic and adipose tissues. An aspect of the pathological process leading to muscle wasting in these diseases are the continuous degeneration/regeneration cycles, which has been proposed to account for the exhaustion of the resident muscle stem cell pool (also called satellite cells).

SUMMARY OF INVENTION

Cell-based therapies involve the use of stem/progenitor cells which, upon delivery to the target organ, repair the damage tissue and reconstitute the resident stem cell pool. Pluripotent stem cells represent a source of such progenitors because of their potential to differentiate in all cell types that constitute the body. For each tissue, identification of cells with stem cell properties is accomplished based on the expression of specific proteins, but the isolation of these cells, unless genetically manipulated, can be achieved mainly using cell surface markers. By analyzing gene expression changes in human pluripotent stem cells undergoing muscle differentiation, Alpha9 integrin, CD54 (also called ICAM1) and Syndecan2 were identified as cell surface markers that allow for the purification of human myogenic stem/progenitor cells.

One embodiment provides a method for isolating myogenic progenitor cells, comprising: (a) providing cells from a tissue, embryonic stem (ES) cells or non-embryonic pluripotent stem cells; (b) isolating myogenic progenitor cells from the cells of (a) using a cocktail of surface markers positive for at least one of CD54, Alpha9 integrin ($\alpha 9\beta 1$) and syndecan2 (SDC2). In one embodiment, the tissue is muscle. In another embodiment, the non-embryonic pluripotent stem cells are induced pluripotent stem (iPS) cells.

In one embodiment, the myogenic progenitor cells are isolated using antibodies for CD54, Alpha9 integrin ($\alpha 9\beta 1$) and syndecan2. In one embodiment, the myogenic progenitor cells are isolated using antibodies for only CD54.

In one embodiment, the ES or pluripotent stem cells have or are undergoing myogenic commitment/differentiation. In one embodiment, the ES or pluripotent stem cells are exposed to PAX7 and/or the cells express PAX7.

In one embodiment, the myogenic progenitor cells are isolated by Fluorescent Activated Cell Sorting (FACS) or magnetic sorting.

One embodiment provides the isolated myogenic progenitor cells described herein, wherein the cells do not express an exogenous marker.

In one embodiment, an effective amount of the isolated cells described herein are transplanted into injured or diseased muscle tissue of a subject, wherein the isolated cells can be optionally cultured after isolation/purification and/or prior to transplantation/administration. In one embodiment, the injury or diseased muscle tissue is a result of injury or overuse, a genetic disorder, cancer, inflammation, infection or medical treatment.

One embodiment provides for the use of the myogenic progenitor cells described herein to prepare a medicament for treating muscle tissue suffering from a disease, disorder or damage. In one embodiment, the disease, disorder or damage is a result of injury or overuse, a genetic disorder, cancer, inflammation, infection or medical treatment.

One embodiment provides a method to prepare a composition comprising mixing an effective therapeutic amount of the muscle stem cells prepared by the methods described herein with a pharmaceutically acceptable carrier.

BRIEF DESCRIPTION OF THE DRAWINGS

Pluripotent stem (PS)-cell-derived cell types hold promise for treating degenerative diseases. However, PS cell differentiation is intrinsically heterogeneous; therefore, clinical translation requires the development of practical methods for isolating progenitors from unwanted and potentially teratogenic cells. Muscle-regenerating progenitors can be derived through transient PAX7 expression. To better understand the biology, and to discover potential markers for these cells, PAX7 genomic targets and transcriptional changes were investigated in human cells undergoing PAX7-mediated myogenic commitment. CD54, integrin a9b1, and Syndecan2 (SDC2) were identified as surface markers on PAX7-induced myogenic progenitors. It is shown that these markers allow for the isolation of myogenic progenitors using both fluorescent- and Current Good Manufacturing Practice (CGMP)-compatible magnetic-based sorting technologies and that CD54+a9b+SDC2+ cells contribute to long-term muscle regeneration in vivo.

PAX (Paired-domain dependent) zscore: −32.228 and PAX7 (Homeodomain dependent) zscore: −21.562.

FIGS. 2A-F: Human pluripotent stem cell-derived myogenic progenitors express CD54, α9β1 and SDC2. A) Histograms from FACS analysis of differentiating pluripotent stem cells using the indicated antibodies. PAX7-expressing cells (GFP+; red line) are compared to control cells (GFP-neg; black line). B) Dot plot FACS analysis of CD54 and α9β1 at day 14 of differentiation and proliferating myogenic progenitors following PAX7 induction. C) Quantification of FACS data from panel B. D) FACS analysis of proliferating myogenic progenitors and retrospective quantification of GFP expression in CD54+α9β1+SDC2+ fraction. E) Quantification of FACS data from panel D. (F) Representative immunostaining (n=5) for the skeletal myogenic differentiation marker MYHC (red) following terminal differentiation of CD54+α9β1+SDC2+, GFP+ and CD54−α9β1− (from panel D+dox, dashed box) sorted cells. Nuclei: blue. Bar 100 μm.  p<0.01, * p<0.001.

FIGS. 3A-F: CGMP-compatible purification of human pluripotent-derived myogenic progenitors. A) CD54, α9β1, SDC2 allow purification of myogenic progenitors from pluripotent cells differentiating in serum-free conditions. FACS analysis of proliferating myogenic progenitors using CD54, α9β1 and SDC2. C) Quantification of FACS data from panel B. D) Immunostaining for the skeletal myogenic differentiation marker MYHC (red) following isolation of CD54+, CD54− and GFP+ cells from serum-free cultures. Nuclei: blue. Bar 100 μm. D) MYHC immunostaining (red) of CD54 or GFP-sorted myogenic progenitors isolated using MACS or FACS. Nuclei: blue. Bar 100 μm. E) Retrospective quantification of GFP expression of proliferating myogenic progenitors isolated using MACS or FACS. F) Quantification of FACS data from panel D.

FIGS. 4A-C: Skeletal muscle regeneration following transplantation of myogenic progenitors isolated using surface markers. Immunostaining of cryosections from PBS-injected or GFP+ sorted and CD54+α9β1+SDC2+ cell-transplanted muscles using human-specific antibodies for DYSTROPHIN (red) and LAMIN A/C (green). Nuclei (blue). Bar 100 μm.

Figure 5:
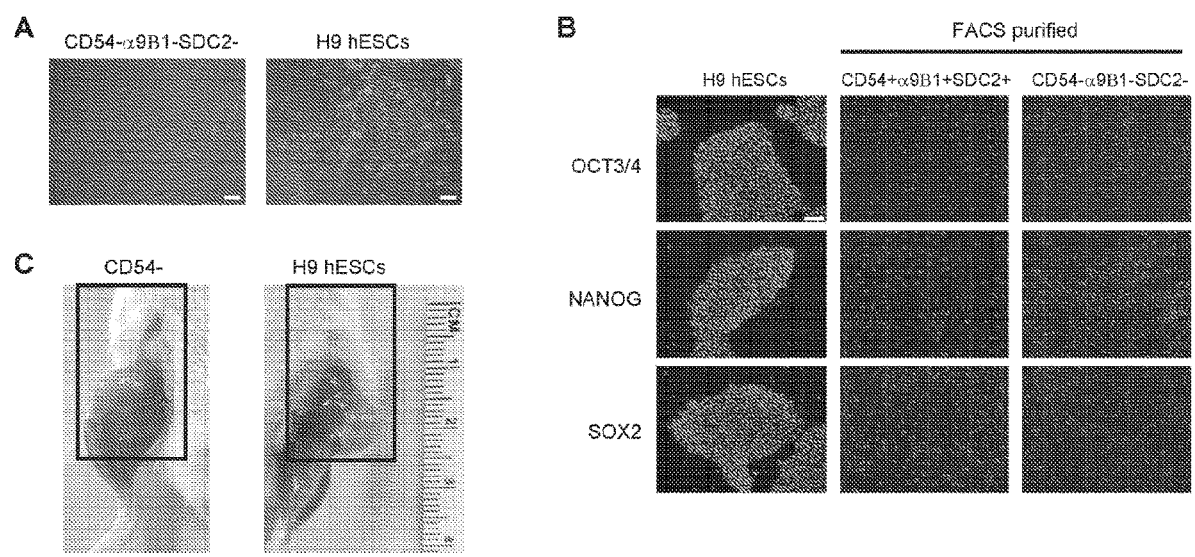

FIGS. 5A-C: Human pluripotent stem cell-derived myogenic progenitors do not contain contaminant pluripotent stem cells. (A) Phase-contrast pictures of human ES cells (H9 hESC) and CD54−α9β1− sorted cells. CD54−α9β1− cells were isolated at the proliferation stage from PAX7-induced cultures. (B) Immunostaining for the pluripotency stem cell markers OCT3/4 (upper panels), NANOG (middle panels) and SOX2 (lower panels). For the analysis, CD54+ α9β1+SDC2+ and CD54−α9β1− sorted cells were compared to pluripotent stem cells (H9 hESCs) (n=3). Specific staining are shown in Red; Nuclei in blue. Bar 100 μm. (C) Assessment of teratoma formation upon intramuscular injection of H9 ES cells (n=2, right) and CD54− FACS sorted cells (n=4, left). Both CD54− and CD54+ cells (n=4, data not shown) gave no visible sign of teratoma.

FIGS. 6A-E: Identification of gene expression changes during human skeletal myogenesis. A) Spearman correlations map of sample vs sample. B) Expression profiles of selected genes from RNA-seq. TPM: Transcripts Per Million. C) qRT-PCR validation of selected genes from RNA-seq. D) Gene Ontology classification of up-regulated genes based on Biological Process. Histogram reports % genes on the y axis and categories ordered based on p value (ascending left to right) on the x axis. E) Expression profiles of beta integrin genes across all RNA-seq samples.

Figure 7:
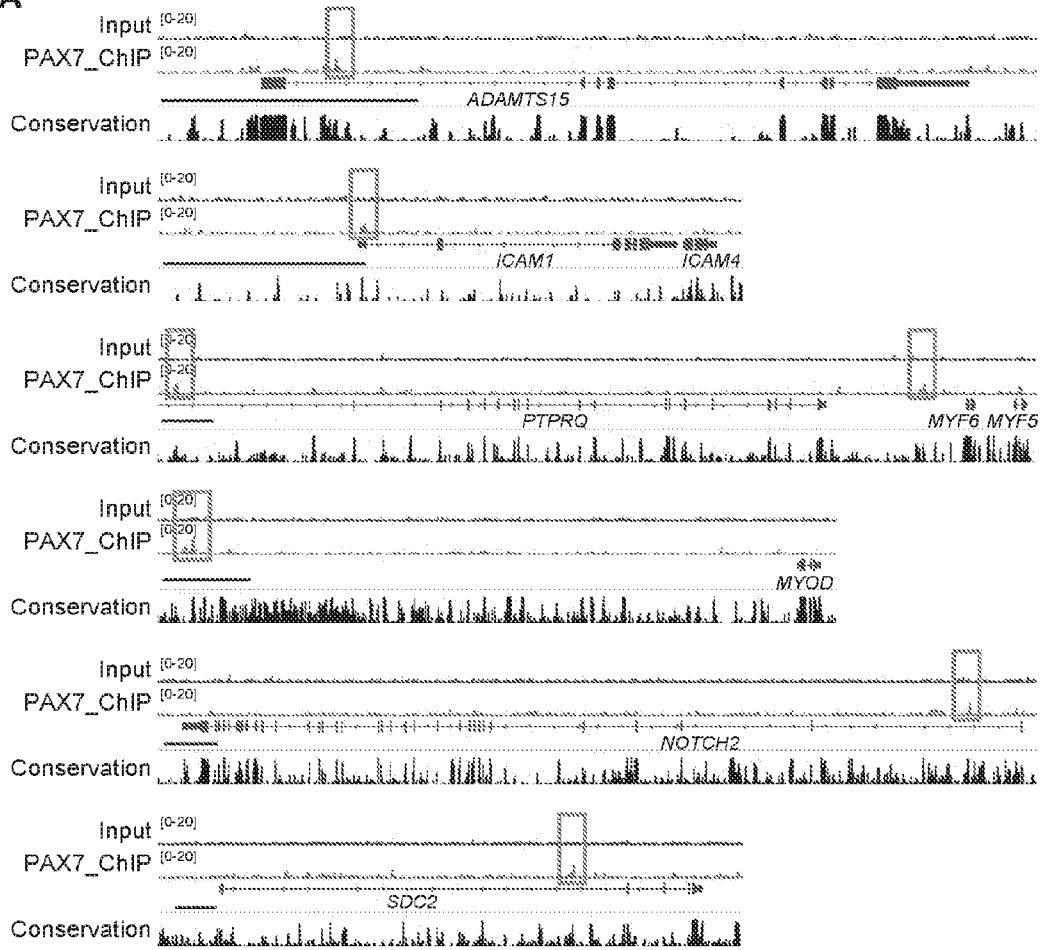
Figure 7:
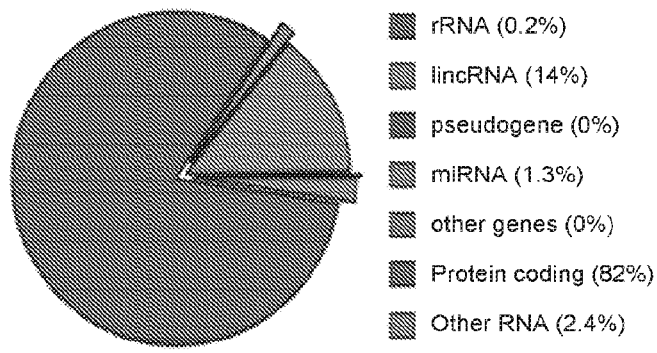

FIGS. 7A-B. A) Snapshot of tracks from the Integrative Genome Viewer (IGV) browser showing PAX7 peaks (green boxes) at the ADAMTS 15, ICAM1, MYF5-MYF6-PTPRQ cluster, MYOD, NOTCH2 and SDC2 loci. Conservation (Phastcons scale 0-1). Bar: 10 Kb. B) Gene type distribution of PAX7 peaks following annotation using PAVIS web resource.

FIGS. 8A-D. Human pluripotent stem cell-derived myogenic progenitors express CD54, α9β1 and SDC2. A) Histograms from FACS analysis of differentiating pluripotent stem cells using the indicated antibodies. PAX7-expressing cells (GFP+; red line) are compared to control cells (GFP-neg; black line). B) FACS analysis of GFP+ and GFPneg cells for CD54 and α9β1 at day 14 of differentiation and proliferating myogenic progenitors following PAX7 induction. C) Quantification of FACS data from panel B. D) Growth curve analysis of GFP+ and CD54+α9β1+SDC2+ sorted cells.

FIGS. 9A-G. CD54, c931, SDC2 allow purification of myogenic progenitors from multiple cell lines. (A) Characterization of the DMD0907, DMD1705 and LGMD2a-1509 human iPS cells. Immunofluorescence for pluripotency stem cell markers NANOG, OCT3/4 and SOX2; Alkaline phosphatase activity; karyotype; teratoma formation. (B) FACS analysis of PAX7-induced cultures from differentiating WT-PLZ (wt human iPS cells) and WT-H9 (human ES cells) cell lines, DMD1705 and DMD0907 (DMD human iPS cells) and LGMD2a-1509 human iPS cells. (C) Representative immunostaining (n=3) for the skeletal myogenic differentiation marker MYHC (red) following isolation of CD54+ α9β1+SDC2+ and GFP+ cells from WT-PLZ, WT-H9 and LGMD2a-1509 cells. Nuclei: blue. Bar 100 μm. (D) Quantification of myogenic potential of sorted sub-fractions (n=4) from differentiation in serum-free condition (panel C of FIG. 3). (E) Representative FACS analysis of differentiating H9 cells (n=3) transduced with third generation lentiviral construct expressing PAX7 (pCCL-PAX7) or PAX7-ires-GFP (pCCL-PAX7-ires-GFP). Note the comparable expression pattern of CD54, α9β1 and SDC2 in dox-treated cultures from both cell lines, regardless of GFP expression. CD54, α9β1 and SDC2 are robustly upregulated in the dox-group by PAX7. (F) Representative immunostaining (n=3) for the skeletal myogenic differentiation marker MYHC (red) following isolation of CD54+α9β1+SDC2+ from H9 pCCL-PAX7 and H9 pCCL-PAX7-ires-GFP. Bar 100 μm. (G) CD54 is highly upregulated following PAX7 (+dox) induction. Upon immunostaining using anti-CD54-biotin followed by incubation with Streptavidin-PeCy7, cell pellet from dox-treated cultures is visibly positive to CD54 compared to uninduced (no dox) cells.

DETAILED DESCRIPTION OF THE INVENTION

Therapeutic application of pluripotent stem cell-derived products represents the ultimate goal of stem cell research. In order to apply this technology to patients, it is fundamental to characterize in detail the cell population of interest and identify methods for its purification from unwanted cells using clinically-compatible methods. In the case of skeletal muscle wasting disorders, it has been shown that human pluripotent stem cell-derived myogenic progenitors represent an excellent candidate for cell therapy.

Provided herein is the molecular signature of human cells undergoing PAX7-mediated myogenic commitment and the identification of CD54, α9β1 and SDC2 as novel surface markers for the purification of human pluripotent-derived myogenic progenitors. Furthermore, these markers allow for the isolation of myogenic progenitors using both fluorescent- and magnetic-based sorting technologies and CD54+ α9β1+ cells contribute to muscle regeneration in vivo. These findings provide for cell therapies for muscle disorders.

Provided herein is the identification of proteins present on the surface of myogenic cells isolated from differentiating pluripotent stem cells, which are endowed with stem/progenitor cell properties. By using antibodies directed toward these proteins, muscle stem/progenitor cells were able to be isolated using Fluorescent Activated Cell Sorting (FACS) or magnetic sorting from cultures of differentiating pluripotent stem cells. In addition, the expression of these markers on the surface of myogenic cells can also be applied to the isolation of muscle stem cells from human tissues and for performing quality control/characterization studies prior to cell delivery into muscles.

Provided herein is a protocol to derive myogenic stem/progenitor cells from differentiating pluripotent stem cells which does not involve GFP expression, such as doxycycline-dependent expression of PAX7-ires-GFP followed by FACS purification based on GFP expression. Since GFP is a gene not present in the human genome, it can potentially induce immune responses. Surface markers represent the ideal alternative for the isolation of these cells and, importantly, allow also for the purification of large amounts of GMP-grade myogenic cells by magnetic sorting.

Although there are currently other protocols to differentiate pluripotent stem cells toward the myogenic lineage, they produce heterogeneous cultures, and cells with limited proliferative capability.

The compositions and methods provided herein allows for the production of a pure population of myogenic progenitors. Moreover, other researchers have identified markers that do not allow for the purification of the myogenic progenitors, thus making Alpha9 integrin, CD54 and Syndecan2 novel markers for the purification of myogenic progenitors from differentiating pluripotent stem cells.

Definitions:

In describing and claiming the invention, the following terminology will be used in accordance with the definitions set forth below. Unless defined otherwise, all technical and scientific terms used herein have the same meaning as commonly understood by one of ordinary skill in the art to which this invention belongs. Any methods and materials similar or equivalent to those described herein can be used in the practice or testing of the present invention. Specific and preferred values listed below for radicals, substituents, and ranges are for illustration only; they do not exclude other defined values or other values within defined ranges for the radicals and substituents.

As used herein, the articles "a" and "an" refer to one or to more than one, i.e., to at least one, of the grammatical object of the article. By way of example, "an element" means one element or more than one element.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 20%.

The term "isolated" refers to a factor(s), cell or cells which are not associated with one or more factors, cells or one or more cellular components that are associated with the factor(s), cell or cells in vivo.

"Cells" include cells from, or the "subject" is, a vertebrate, such as a mammal, including a human. Mammals include, but are not limited to, humans, farm animals, sport animals and companion animals. Included in the term "animal" is dog, cat, fish, gerbil, guinea pig, hamster, horse, rabbit, swine, mouse, monkey (e.g., ape, gorilla, chimpanzee, or orangutan), rat, sheep, goat, cow and bird.

"Progenitor cells" are cells produced during differentiation of a stem cell that have some, but not all, of the characteristics of their terminally differentiated progeny. Defined progenitor cells, such as "endothelial progenitor cells," are committed to a lineage, but not to a specific or terminally differentiated cell type.

"Self-renewal" refers to the ability to produce replicate daughter stem cells having differentiation potential that is identical to those from which they arose. A similar term used in this context is "proliferation."

"Expansion" refers to the propagation of a cell or cells without differentiation.

"Engraft" or "engraftment" refers to the process of cellular contact and incorporation into an existing tissue of interest in vivo.

"Cytokines" refer to cellular factors that induce or enhance cellular movement, such as homing of stem cells, progenitor cells or differentiated cells. Cytokines may also stimulate such cells to divide.

"Differentiation factors" refer to cellular factors, preferably growth factors or factors that induce lineage commitment.

As used herein, "treat," "treating" or "treatment" includes treating, preventing, ameliorating, or inhibiting an injury or disease related condition and/or a symptom of an injury or disease related condition.

An "effective amount" generally means an amount which provides the desired local or systemic effect, such as enhanced performance. For example, an effective dose is an amount sufficient to affect a beneficial or desired clinical result. Said dose could be administered in one or more administrations and could include any preselected amount of cells. The precise determination of what would be considered an effective dose may be based on factors individual to each subject, including their size, age, injury and/or disease or being treated and amount of time since the injury occurred or the disease began. One skilled in the art, specifically a physician, would be able to determine the number of cells that would constitute an effective dose.

"Co-administer" can include simultaneous and/or sequential administration of two or more agents.

The terms "comprises," "comprising," and the like can have the meaning ascribed to them in U.S. Patent Law and can mean "includes," "including" and the like. As used herein, "including" or "includes" or the like means including, without limitation.

Aspects of the Invention

Compositions and methods of the invention are directed to an assay and a panel of makers for positive and/or negative selection of myogenic progenitor cells from a variety of sources including muscle tissues (such as from muscle biopsies) or stem cells undergoing myogenic commitment (e.g., iPS cells and ES cells etc.) to obtain pluripotent stem cell-derived myogenic progenitors.

Muscle Diseases/Disorders

Muscles help you move and help your body work. Different types of muscles have different jobs. There are many problems that can affect muscles. Muscle disorders can cause weakness, pain or even paralysis.

Causes of muscle diseases/disorders include injury or overuse, such as sprains or strains, cramps or tendinitis; a genetic disorder, such as muscular dystrophy, cancer, inflammation, such as myositis, diseases of nerves that affect muscles, infections and certain medicines.

Myopathy is a muscular disease in which the muscle fibers do not function for any one of many reasons, resulting in muscular weakness. "Myopathy" simply means muscle disease (myo—Greek guo "muscle"+pathos—pathy Greek "suffering"). This meaning implies that the primary defect is within the muscle, as opposed to the nerves ("neuropathies" or "neurogenic" disorders) or elsewhere (e.g., the brain etc.). Muscle cramps, stiffness, and spasm can also be associated with myopathy.

Muscular disease can be classified as neuromuscular or musculoskeletal in nature. Some conditions, such as myositis, can be considered both neuromuscular and musculoskeletal.

Myopathies (also known as muscular dystrophy) in systemic disease results from several different disease processes including hereditary (presenting birth), endocrine, inflammatory (inflammatory myopathies caused by, for example, dermatomyositis, polymyositis; inclusion body myositis, viral (HIV), paraneoplastic, infectious, drug- and toxin-induced (e.g., alcohol, corticosteroids, narcotics, colchicines, chloroquine), critical illness myopathy, metabolic, paraneoplastic myopathy, collagen related, and myopathies with other systemic disorders. Patients with systemic myopathies often present acutely or sub acutely. On the other hand, familial myopathies or dystrophies generally present in a chronic fashion with exceptions of metabolic myopathies where symptoms on occasion can be precipitated acutely. Most of the inflammatory myopathies can have a chance association with malignant lesions; the incidence appears to be specifically increased in patients with dermatomyositis.

There are many types of myopathy:

Inherited forms include: dystrophies (or muscular dystrophies) are a subgroup of myopathies characterized by muscle degeneration and regeneration. Clinically, muscular dystrophies are typically progressive, because the muscles' ability to regenerate is eventually lost, leading to progressive weakness, often leading to use of a wheelchair, and eventually death, usually related to respiratory weakness), myotonia, neuromyotonia, congenital myopathies (which do not show evidence for either a progressive dystrophic process (i.e., muscle death) or inflammation, but instead characteristic microscopic changes are seen in association with reduced contractile ability of the muscles. Congenital myopathies include, but are not limited to: nemaline myopathy (characterized by presence of "nemaline rods" in the muscle), multi/minicore myopathy (characterized by multiple small "cores" or areas of disruption in the muscle fibers), centronuclear myopathy (or myotubular myopathy) (in which the nuclei are abnormally found in the center of the muscle fibers), a rare muscle wasting disorder), mitochondrial myopathies (which are due to defects in mitochondria, which provide a source of energy for muscle), familial periodic paralysis, inflammatory myopathies (which are caused by problems with the immune system attacking components of the muscle, leading to signs of inflammation in the muscle), metabolic myopathies (which result from defects in biochemical metabolism that primarily affect muscle), glycogen storage diseases (which may affect muscle) and/or lipid storage disorder.

Acquired forms include: external substance induced myopathy, Drug-induced myopathy, Glucocorticoid myopathy (is caused by this class of steroids increasing the breakdown of the muscle proteins leading to muscle atrophy), Alcoholic myopathy, Myopathy due to other toxic agents, dermatomyositis produces muscle weakness and skin changes; polymyositis produces muscle weakness, inclusion body myositis (is a slowly progressive disease that produces weakness of hand grip and straightening of the knees), Myositis ossifications, Rhabdomyolysis and/or myoglobinurias.

Isolated Myogenic Progenitor Cells

Myogenic/Muscle progenitor cells can be isolated from various sources including, but not limited to, muscle tissue biopsy and differentiating pluripotent stem cells, such as induced pluripotent stem (iPS) cells and embryonic stem (ES) cells.

Provided herein is a panel of markers, as well as methods, to isolate myogenic progenitor cells from various sources, the method includes: 1) obtain cells from differentiating iPS or ES cells or muscle biopsy; 2) isolate myogenic progenitor cells using a cocktail of surface markers for including one or more of the following markers: positive markers: CD54, α9β1 and SDC2; and 3) optionally transplant the isolated progenitor cells into injured or diseased muscle of a subject in need thereof (the cells can be autologous, heterologous, xenogeneic or a combination thereof), wherein the selected cells can be optionally cultured after selection and/or prior to transplantation/administration.

Disclosed herein are surface proteins expressed on progenitor cells to which antibodies, such as monoclonal antibodies, are available to an art worker (e.g., commercially available or readable made by of skill in the art). Antibodies can be used to purify the progenitor cells, such as myogenic progenitor cells, from in vitro iPS or ES cells undergoing differentiation. For example, the antibodies can be used in FACS or magnetic beads to sort, isolate and purify progenitor cells.

The markers described herein can be combined in any way to enrich, for example, progenitor cells, such as myogenic progenitor cells. For example, the markers/proteins can be used for identification or purification of such cells from any source (e.g., human in vitro differentiating iPS or ES cells, and human muscle etc.). The markers identified herein provides for an improved method to identify such cells as well as isolate and purify them.

The markers described herein can also be combined with other markers, including those not described in this application, i.e. they could be used to enhance or improve other protocols based on other markers, for example CD56.

The methods of the present invention can be used to isolate progenitor cells from any adult, child, or fetus, of human, rat, murine and other species origin. It is therefore now possible for one of skill in the art to obtain muscle biopsies (or other sources such as differentiated/differentiating iPS or ES cells) and isolate the cells using positive or negative selection techniques known to those of skill in the art, relying upon the markers expressed on or in these cells, as identified by the inventors, without undue experimentation, to isolate progenitor cells (e.g., myogenic progenitor cells).

An issue regarding the use of progenitor cells or their progeny is the purity of the enriched or isolated cell population. Muscle biopsies, for example, comprise mixed populations of cells, which can be purified to a degree sufficient to produce a desired effect. Those skilled in the art can readily determine the percentage of progenitor cells or progeny in a population using various well-known methods, such as fluorescence activated cell sorting (FACS). Ranges of purity in populations comprising progenitor cells (e.g., muscle progenitor cells), or their differentiated progeny, include about 50-55%, about 55-60%, and about 65-70%. Included is purity that is about 70-75%, about 75-80%, about 80-85%; such as purity that is about 85-90%, about 90-95%, and about 95-100%. However, populations with lower purity can also be useful, such as about 25-30%, about 30-35%, about 35-40%, about 40-45% and about 45-50%. Purity of progenitor stem cells or their progeny can be determined, for example, according to the gene expression profile within a population. Dosages can be readily adjusted by those skilled in the art (e.g., a decrease in purity may require an increase in dosage).

Along with the uses described herein, the cells purified/isolated using the markers disclosed herein can be used to study compounds and their effects on the stem cells (e.g., a screen for compounds that differentiate such cells).

Formulations/Administer Cells

The cells prepared as described herein can be administered to a subject by a variety of methods available to the art, including but not limited to localized injection, catheter administration, systemic injection, intraperitoneal injection, parenteral administration, intra-arterial injection, intravenous injection, intraventricular infusion, intraplacental injection, intrauterine injection, surgical intramyocardial injection, transendocardial injection, transvascular injection, intracoronary injection, intramuscular injection, surgical injection into a tissue of interest or via direct application to tissue surfaces (e.g., during surgery or on a wound).

Intravenous injection is the simplest method of cell administration; however a greater degree of dependence on homing of the stem cells is required for them to reach the tissue of interest. "Homing" of the cells to the injured tissues would concentrate the implanted cells in an environment favorable to their growth and function. Pre-treatment of a patient with cytokine(s) to promote homing is another alternative contemplated in the methods of the present invention. Where homing signals may be less intense, injection of the cells directly into the muscle can produce a more favorable outcome. Certain cytokines (e.g., cellular factors that induce or enhance cellular movement, such as homing of stem cells, progenitor cells or differentiated cells) can enhance the migration of cells or their differentiated counterparts to the site of damaged muscle tissue. Cytokines include, but are not limited to, stromal cell derived factor-1 (SDF-1), stem cell factor (SCF) and granulocyte-colony stimulating factor (G-CSF). Cytokines also include any which promote the expression of endothelial adhesion molecules, such as ICAMs, VCAMs, and others, which facilitate the homing process.

Viability of newly forming tissues can be enhanced by angiogenesis. Factors promoting angiogenesis include but are not limited to VEGF, aFGF, angiogenin, angiotensin-1 and -2, betacellulin, bFGF, Factor X and Xa, HB-EGF, PDGF, angiomodulin, angiotropin, angiopoetin-1, prostaglandin E1 and E2, steroids, heparin, 1-butyryl-glycerol, nicotinic amide.

Factors that decrease apoptosis can also promote the formation of new tissue, such as muscle. Factors that decrease apoptosis include but are not limited to β-blockers, angiotensin-converting enzyme inhibitors (ACE inhibitors), AKT, HIF, carvedilol, angiotensin II type 1 receptor antagonists, caspase inhibitors, cariporide, and eniporide.

Exogenous factors (e.g., cytokines, differentiation factors (e.g., cellular factors, such as growth factors or angiogenic factors that induce lineage commitment), angiogenesis factors and anti-apoptosis factors) can be administered prior to, after or concomitantly with the skeletal muscle cells. Doses for administration(s) are variable and may include an initial administration followed by subsequent administrations.

In current human studies of autologous mononuclear bone marrow cells, empirical doses ranging from 1 to $4 \times 10^7$ cells have been used. However, different scenarios may require optimization of the amount of cells injected into a tissue of interest. Thus, the quantity of cells to be administered will vary for the subject being treated. In one embodiment, between $10^4$ to $10^8$, more preferably $10^5$ to $10^7$, and most preferably, $3 \times 10^7$ stem cells and optionally, 50 to 500 µg/kg per day of a cytokine can be administered to a human subject. For local muscle placement/injection, as few as 40,000 cells can be administered. However, the precise determination of what would be considered an effective dose may be based on factors individual to each patient, including their size, age, disease or injury, size damage, amount of time since the damage occurred and factors associated with the mode of delivery (direct injection—lower doses, intravenous—higher doses).

The skilled artisan can readily determine the amount of cells and optional additives, vehicles, and/or carrier in compositions and to be administered in methods of the invention. Typically, any additives (in addition to the active cell(s) and/or cytokine(s)) are present in an amount of 0.001 to 50 wt % solution in phosphate buffered saline, and the active ingredient is present in the order of micrograms to milligrams, such as about 0.0001 to about 5 wt %, including about 0.0001 to about 1 wt %, including about 0.0001 to about 0.05 wt % or about 0.001 to about 20 wt %, including about 0.01 to about 10 wt %, and including about 0.05 to about 5 wt %. Of course, for any composition to be administered to an animal or human, and for any particular method of administration, it is preferred to determine therefore: toxicity, such as by determining the lethal dose (LD) and $LD_{50}$ in a suitable animal model e.g., rodent such as mouse; and, the dosage of the composition(s), concentration of components therein and timing of administering the composition(s), which elicit a suitable response.

When administering a therapeutic composition of the present invention, it will generally be formulated in a unit dosage injectable form (solution, suspension, emulsion). The pharmaceutical formulations suitable for injection include sterile aqueous solutions and dispersions. The carrier can be a solvent or dispersing medium containing, for example, water, saline, phosphate buffered saline, polyol (for example, glycerol, propylene glycol, liquid polyethylene glycol, and the like) and suitable mixtures thereof.

Additionally, various additives which enhance the stability, sterility, and isotonicity of the compositions, including antimicrobial preservatives, antioxidants, chelating agents, and buffers, can be added. Prevention of the action of microorganisms can be ensured by various antibacterial and antifungal agents, for example, parabens, chlorobutanol, phenol, sorbic acid, and the like. In many cases, it will be desirable to include isotonic agents, for example, sugars, sodium chloride, and the like. Prolonged absorption of the injectable pharmaceutical form can be brought about by the use of agents delaying absorption, for example, aluminum monostearate and gelatin. According to the present invention, however, any vehicle, diluent, or additive used would have to be compatible with the cells.

Sterile injectable solutions can be prepared by incorporating the cells utilized in practicing the present invention in the required amount of the appropriate solvent with various amounts of the other ingredients, as desired.

In one embodiment, the cells can be administered initially, and thereafter maintained by further administration of the cells. For instance, the cells can be administered by one method of injection, and thereafter further administered by a different or the same type of method. For example, cells can be administered by surgical injection to bring muscle function to a suitable level. The patient's levels can then be maintained, for example, by intravenous injection, although other forms of administration, dependent upon the patient's condition, can be used.

It is noted that human subjects are treated generally longer than the canines or other experimental animals, such that treatment has a length proportional to the length of the disease process and effectiveness. The doses may be single doses or multiple doses over a period of several days. Thus, one of skill in the art can scale up from animal experiments, e.g., rats, mice, canines and the like, to humans, by techniques from this disclosure and documents cited herein and the knowledge in the art, without undue experimentation. The treatment generally has a length proportional to the length of the disease process and drug effectiveness and the subject being treated.

Examples of compositions comprising the cells of the invention include liquid preparations for administration, including suspensions; and, preparations for direct or intravenous administration (e.g., injectable administration), such as sterile suspensions or emulsions. Such compositions may be in admixture with a suitable carrier, diluent, or excipient such as sterile water, physiological saline, glucose, dextrose, or the like. The compositions can also be frozen. The compositions can contain auxiliary substances such as wetting or emulsifying agents, pH buffering agents, gelling or viscosity enhancing additives, preservatives, flavoring agents, colors, and the like, depending upon the route of administration and the preparation desired. Standard texts, such as "REMINGTON'S PHARMACEUTICAL SCIENCE", 17th edition, 1985, incorporated herein by reference, may be consulted to prepare suitable preparations, without undue experimentation.

Compositions of the invention are conveniently provided as liquid preparations, e.g., isotonic aqueous solutions, suspensions, emulsions or viscous compositions, which may be buffered to a selected pH. Liquid preparations are normally easier to prepare than gels, other viscous compositions, and solid compositions. Additionally, liquid compositions are somewhat more convenient to administer, especially by injection. Viscous compositions, on the other hand, can be formulated within the appropriate viscosity range to provide longer contact periods with specific tissues.

The choice of suitable carriers and other additives will depend on the exact route of administration and the nature of the particular dosage form, e.g., liquid dosage form (e.g., whether the composition is to be formulated into a solution, a suspension, gel or another liquid form, such as a time release form or liquid-filled form).

Solutions, suspensions and gels normally contain a major amount of water (preferably purified, sterilized water) in addition to the cells. Minor amounts of other ingredients such as pH adjusters (e.g., a base such as NaOH), emulsifiers or dispersing agents, buffering agents, preservatives, wetting agents and jelling agents (e.g., methylcellulose), may also be present. The compositions can be isotonic, i.e., they can have the same osmotic pressure as blood and lacrimal fluid.

The desired isotonicity of the compositions of this invention may be accomplished using sodium chloride, or other pharmaceutically acceptable agents such as dextrose, boric acid, sodium tartrate, propylene glycol or other inorganic or organic solutes. Sodium chloride is preferred particularly for buffers containing sodium ions.

Viscosity of the compositions, if desired, can be maintained at the selected level using a pharmaceutically acceptable thickening agent. Methylcellulose is preferred because it is readily and economically available and is easy to work with. Other suitable thickening agents include, for example, xanthan gum, carboxymethyl cellulose, hydroxypropyl cellulose, carbomer, and the like. The preferred concentration of the thickener will depend upon the agent selected and the desired viscosity. Viscous compositions are normally prepared from solutions by the addition of such thickening agents.

A pharmaceutically acceptable preservative or cell stabilizer can be employed to increase the life of the compositions. Preferably, if preservatives are necessary, it is well within the purview of the skilled artisan to select compositions that will not affect the viability or efficacy of the cells as described in the present invention.

Compositions can be administered in dosages and by techniques available to those skilled in the medical and veterinary arts taking into consideration such factors as the age, sex, weight, and condition of the particular patient, and the composition form used for administration (e.g., solid vs. liquid).

Suitable regimes for initial administration and further doses or for sequential administrations also are variable, may include an initial administration followed by subsequent administrations.

The following example is intended to further illustrate certain embodiments of the invention and are not intended to limit the scope of the invention in any way.

EXAMPLE

Example 1

PAX7 Targets, CD54, Integrin α9β1, and SDC2, Allow Isolation of Human ESC/iPSC-Derived Myogenic Progenitors Isolation of GMP-Compatible Pluripotent-Derived Human Myogenic Progenitors Using Surface Markers Introduction Pluripotent stem cells are an attractive option for regenerative medicine, as they can repeatedly produce large amounts of differentiated tissue, thus representing an unlimited source of cells for therapeutic application. Nevertheless, a major requirement remains the development of protocols, compatible with Current Good Manufacturing Practice (CGMP) standards, for the isolation of specific cell populations with proven in vivo regenerative potential while preventing the presence of contaminating teratogenic undifferentiated pluripotent stem cells.

Cell-based therapies are particularly attractive for muscular dystrophies (Tedesco and Cossu, 2012). These are a heterogeneous group of genetic diseases characterized by relentless and catastrophic progression of muscle wasting, leading to premature death in high-risk disorders, such as Duchenne muscular dystrophy (DMD) (Emery, 2002). Following the expansion of the pluripotent stem (PS) cell field, several pioneering studies from our laboratory (Darabi et al., 2008, 2011a, 2011b, 2012; Filareto et al., 2012, 2013) have demonstrated functionally beneficial engraftment, and many others (Borchin et al., 2013; Chal et al., 2015; Choi et al., 2016; Shelton et al., 2014; Xi et al., 2017; Xu et al., 2013) have demonstrated skeletal myogenic differentiation in vitro of both embryonic stem cells (ESCs) and induced pluripotent stem cells (iPSCs). It was shown that, upon controlled expression of PAX7, followed by GFP-mediated sorting, human ESC/iPSC derived myogenic progenitors proliferate robustly in vitro and contribute to muscle regeneration in vivo, as transplanted cells generate functional myofibers while also seeding the muscle stem compartment (Darabi et al., 2012).

To successfully translate this approach toward the clinic, the need to identify specific surface markers for the isolation of this progenitor cell population, which would avoid potentially immunogenic transgenes (Ansari et al., 2016) (e.g., GFP or mCherry) as well as establish quality control for the CGMP process was envisioned. For this, whole-transcriptome sequencing analysis was performed, in which different time points along the PAX7-dependent myogenic commitment from human PS cells was systematically evaluated. The results revealed a subset of genes differentially expressed at various stages of this differentiation process, including a discrete number of surface markers. After fluorescence-activated cell sorting (FACS)-mediated screening, we identified integrin a9b1, CD54, and SDC2 as potential surface markers to be used for the prospective isolation of human PS-cell-derived myogenic progenitors. It is demonstrated herein that these surface molecules reproducibly allow the isolation of myogenic progenitors from multiple human ESC/iPSC lines and that a9b1+CD54+SDC2+ (triple+) cells represent a homogeneous population of PAX7+ cells endowed with in vivo muscle regeneration potential. These findings provide a clinically relevant method for the purification of PS-cell-derived muscle progenitors for therapeutic applications.

Materials and Methods

Cell Cultures and Differentiation.

Inducible PAX7 Human H9 ES cells and control iPS cells were generated previously (Darabi et al., 2012) and they were maintained on matrigel-coated flasks using mTeSR (Stem Cell Technology). Cells were passaged at 90% of plate density using Accumax (3 min incubation) followed by gentle resuspension. After centrifuge for 5 min at 300 g, cell pellets were resuspended in mTeSR supplemented with 10 µM of the ROCK inhibitor Y-27632 and replated in matrigel-coated flasks or used for differentiation. For skeletal myogenic differentiation (protocol described in (Darabi et al., 2012)), cells were plated in 6 cm non-adherent Petri dishes and incubated at 37° C., 5% $CO_2$ on a shaker at 60 RPM. After 2 days, mTeSR was replaced with EB Myogenic (EBM) Media supplemented with 10 µM Y-27632 and 5 µM GSK3 inhibitor (CHIR990217). 2 days later, media was replaced to remove GSK3 inhibitor and the formed EBs were cultured in suspension on the shaker up to day 7. After plating EBs on gelatin-coated flasks using EBM+10 ng/ml human basic FGF (bFGF), EBs were allowed to adhere on the flasks for 3 days and then supplemented with 1 µg/ml doxycycline (dox) for PAX7 induction. At day 14, cells were harvested using Trypsin+EDTA solution and FACS sorted based on GFP expression. GFP+ cells were then plated at $1.5*10^6$ cells per T25 on gelatin-coated flasks using EBM supplemented with 5 ng/ml bFGF, 1 µg/ml dox and 5 µM ROCK inhibitor (ROCK inhibitor was removed the day after) and cultured as monolayer. At ~90% cell density, cells were passaged using Trypsin+EDTA and replated on new gelatin-coated flasks. Terminal differentiation was induced by switching 100% confluent cultures to KOSR differentiation media (KnockOut™ DMEM+20% KnockOut™ Serum Replacement+1% Penicillin/Streptomycin+2 mM Gluta-MAX™—all products from Gibco). Data presented are from biological replicates (at least 3 independent experiments).

FACS Analysis, Sorting and MACS.

Cultures from day 14 or day 23 (proliferating myogenic progenitors) were washed once with PBS and then harvested using Enzyme-free cell dissociation buffer (Gibco) for ~10 min at 37° C. followed by gentle resuspension with pipette. Cells were collected, centrifuged, washed with PBS and filtered through a 70 µm strain to remove cell clumps. Cell pellets were then resuspended in PBS supplemented with 10% FBS (PBSF) in the presence of Fc Block (1 µl/million cells—BD bioscience) and incubated for 5 minutes. Staining was performed by adding 1 µl of antibody/million cells followed by 20 min incubation on ice. For biotin-conjugated primary antibodies, samples were washed once with PBS then followed by 5 min incubation with PE-Cy7 conjugated Streptavidin (0.5 µl/million cells diluted in PBSF). The list of antibody used is provided in Table 1. Cells were washed with PBS and then resuspended in PBSF containing propidium iodide to exclude dead cells. Samples were analyzed and sorted using a FACSAria II (BD Biosciences). For MACS purification, cells were collected and processed as described above and stained using Biotin-conjugated anti-CD54 antibody followed by incubation with Streptavidin-conjugated microbeads (Miltenyi) following the manufacturer's instructions. Magnetic cell separation was performed on MS columns (Miltenyi).

TABLE 1

List of Antibodies used:

| | Manufacturer | Catalog number |
|---|---|---|
| Antibody - FACS | | |
| Streptavidin PE-Cyanine7 | eBioscience | 25-4317-82 |
| PE anti-human Integrin α9β1 Antibody | BioLegend | 351605 |
| APC anti-human CD156c (ADAM10) Antibody | BioLegend | 352705 |
| Human ADAMTS15 MAb (Clone 561819) | R&D systems | MAB5149 |
| Anti-Human CD9 PE | eBioscience | 12-0098-41 |
| Anti-Human CD24 PE-Cyanine7 | eBioscience | 25-0247-41 |
| Anti-Human CD47 APC | eBioscience | 17-0479-41 |
| Anti-Human CD49e (Integrin alpha 5) Biotin | eBioscience | 13-0496-80 |
| Biotin anti-human CD51 Antibody | BioLegend | 327906 |
| Anti-Human CD54 (ICAM-1) APC | eBioscience | 17-0549-41 |
| Anti-Human CD54 (ICAM-1) Biotin | eBioscience | 13-0549-82 |
| APC anti-human CD73 | eBioscience | 17-0739-41 |
| Anti-Human CD83 PE-Cyanine7 | eBioscience | 25-0839-41 |
| PE/Cy7 anti-human CD325 (N-Cadherin) Antibody | BioLegend | 350811 |
| Biotin anti-human/mouse CXCR7 Antibody | BioLegend | 331111 |
| ELFN1 Antibody (N-12) | Santa Cruz Biotech. | sc-136660 |
| Anti-Human CD326 (EpCAM) PE-Cyanine7 | eBioscience | 25-9326-41 |
| PE anti-IL-6R alpha antibody | BD Biosciences | 561696 |
| Anti-Human/Mouse Notch2 PE | eBioscience | 12-5786-80 |
| Human Syndecan-2/CD362 APC-conjugated Antibody | R&D systems | FAB2965A |
| Antibody - Immunostaining | | |
| Myosin Heavy Chain | DSHB | Clone MF20 |
| Myogenin | DSHB | Clone F5D |
| Pax7 | DSHB | Clone Pax7 |
| Human Dystrophin, clone 2C6 (MANDYS106) | EMD | MABT827 |

TABLE 1-continued

List of Antibodies used:

| | Manufacturer | Catalog number |
|---|---|---|
| Human Lamin A + C antibody [EPR4100] | Abcam | ab108595 |
| M-cadherin | BD Biosciences | 611101 |
| Laminin α-2(4H8-2) | Santa Cruz Biotech. | sc-59854 |
| OCT3-4 | Santa Cruz Biotech. | sc-5279 |
| NANOG | Santa Cruz Biotech. | sc-374103 |
| SOX2 | Santa Cruz Biotech. | sc-17320 |
| Alexa-555 goat anti-mouse | ThermoFisher | A-21424 |
| Alexa-488 goat anti-rabbit | ThermoFisher | A-11008 |
| Alexa-647 goat anti-rat | ThermoFisher | A-11006 |

RNA isolation, library preparation and sequencing.

Cells were resuspended in Trizol (Invitrogen) and purified using the Purelink RNA mini kit (Life Technologies) following the manufacturer's instructions. DNase treatment was performed on column during the RNA isolation procedure. RNAs were retro-transcribed using Superscript Vilo (Invitrogen). Gene expression analyses were performed using an amount of cDNA solution corresponding to 12.5 ng of starting RNA for each reaction. qRT-PCR analysis was performed using TaqMan Universal PCR Master Mix and TaqMan probes (Applied Biosystems).

Sequencing libraries were generated from 100 ng of total RNA using the TruSeq RNA Sample Preparation kit (Illumina) using half the reaction volumes required by the Illumina protocol and quantitated using the Qubit fluorometer (Life Technologies) following the manufacturer's instructions. The libraries were then pooled using 50 ng/sample for a 51+7 cycle Single Read run on the HiSeq 2500 (Illumina) either by high output or rapid run sequencing.

Transcriptome Analysis

Each sample's reads were then processed using RSEM version 1.2.3 (with bowtie-0.12.9 for the alignment step) (Langmead et al., 2009; Li and Dewey, 2011). Percentage of reads mapped to the transcriptome ranged from 53% to 65%. Genes were filtered to select only those with median-normalized TPM (Transcripts Per Million reads) greater than 64 in at least one sample, and a fold change greater than 4 between the median-normalized Expected Counts (EC) of any two samples. Heat map of relative expression (displayed in FIG. 1B) display for each gene G and sample S the value log 2 ((1+median-normalized EC(G,S))/(1+mean over all Si median-normalized EC(G, Si)). Data were uploaded in NCBI Gene Expression Omnibus and are available at the accession number GSE98976.

Raw sequences were also analyzed using a customized pipeline (gopher-pipelines; bitbucket.org/jgarbe/gopher-pipelines/overview) developed and maintained by the Minnesota Supercomputing Institute (MSI). Briefly, quality controls were performed on each FASTQ files using FastQC (version 0.11.5) before and after adapter trimming with Trimmomatic (version 0.33) (Bolger et al., 2014). Between 7,105,374 to 10,951,120 reads (mean 8,929,324) passed filtering. Post-trimming sequences were aligned to GRCh38/hg38 reference genome using HISAT2 (version 2.0.2) (Kim et al., 2015). FPKM values were then generated using Cufflinks (version 2.2.1) (Trapnell et al., 2012).

Public data: RNA-seq data of developing human paraxial mesoderm from 4.5-5 weeks of gestation human embryos were downloaded from NCBI Gene Expression Omnibus (GSE90876). Sequence analysis was performed using the same method described above. Between 11,735,971 to 16,786,367 reads (mean 13,745,343) were generated per library and the average quality score passing quality filter were Q39. After adapter trimming, between 11,699,048 to 16,732,983 reads (mean 13,705,360) passed filtering.

Heat map (relative to FIG. 6C): FPKM values were used to generate heat maps in R (version 3.2.3) using pheatmap (version 1.0.8) package. Briefly, FPKM values of the two datasets were filtered independently to include transcripts with FPKM>1 in at least 10% of the samples. The FPKM values of the union of transcripts (21,918) were then log 2 transformed and mean centered within each dataset. Then the two datasets were combined to generate heat maps. Hierarchical clustering was performed using euclidean distances and average linkage clustering method.

Chromatin-Immunoprecipitation, Library Generation, Sequencing and Data Analysis.

Chromatin-immunoprecipitation was performed following the protocol described by Young and colleagues (Boyer L A, et al 2005) with minor modifications. Briefly, day 23 Proliferating Myogenic progenitors (+dox) were collected using trypsin and reaction was inhibited by adding 10% FBS/PBS.

Single cells were washed once with PBS, resuspended in 10% FBS/PBS and supplemented with formaldehyde (final concentration 1%) for crosslinking of protein-DNA complexes (10 minutes at RT) followed by quenching with glycine. Cells were snap-frozen in liquid nitrogen and stored at −80° C. if not processed immediately. Cell pellets were incubated in lysis buffer LB 1 supplemented with protease inhibitors (50 mM HEPES KOH pH7.5, 140 mM NaCl, 1 mM EDTA, 10% glycerol, 0.5% NP40, 0.25% Triton X-100+Complete-mini—Roche) for 10 minutes at +4° C. followed by incubation in buffer LB2 supplemented with protease inhibitors (10 mM TRIS HCl pH 8, 200 mM NaCl, 1 mM EDTA, 0.5 mM EGTA+Complete-mini—Roche) for 10 minutes at +4° C. Cell pellet was then resuspended in LB3 supplemented with protease inhibitors (10 mM TRIS HCl pH 8, 100 mM NaCl, 1 mM EDTA, 0.5 mM EGTA, 0.1% Sodium Deoxycholate, 0.5% N-lauroylsarcosine+Complete-mini—Roche) and then sonicated with a Branson sonicator at 18% power for 1 minute with intervals of 10 sec ON-10 sec OFF. Each sample was subjected to 5-6 cycles of sonication to reach an average chromatin size of 300 bp. After shearing, samples were centrifuged for 10 minutes at 16000 g and snap frozen in liquid nitrogen if not processed immediately. For each ChIP, 20 g of chromatin (diluted to 400 µl) were precleared for 4 h at 4° C. with 15 µl of BSA-blocked Protein G-conjugated sepharose beads (GE healthcare) and then supplemented with ¹⁄₁₀ volume of 10% Triton X-100. Immunoprecipitation was performed by overnight incubation with normal mouse IgG (8 µg—Santa Cruz Biotechnology) or anti-Pax7 antibody (1:50—Developmental Studies Hybridoma Bank). Immune complexes were recovered by incubation with 15 µl of BSA-blocked Protein G-conjugated sepharose beads for 4 h at 4° C. and then washed 5 times with RIPA wash buffer (50 mM HEPES KOH pH7.5, 500 mM LiCl, 1 mM EDTA, 1% NP40, 0.25% Triton X-100, 0.7% Sodium Deoxycholate) and one time with TEN buffer (10 mM TRIS HCl pH 8, 1 mM EDTA, 50 mM NaCl). Immunoprecipitated chromatin was recovered by incubating beads with 200Il of Elution buffer (50 mM TRIS HCl pH 8, 10 mM EDTA, 1% Sodium Dodecyl Sulfate) for 20 minutes at 65° C. Chromatin from IP and Input (equivalent to 1% of starting material) was reverse crosslinked overnight at 65° C., then diluted 1:1 with TE (10 mM TRIS HCl pH 8, 1 mM EDTA) supplemented with 4 µl of RNaseA 20 mg/ml and incubated for 2 hours at 37° C. followed by Proteinase K treatment (4 µl of 20 mg/ml stock for each sample) for 30 minutes at 55° C. DNA was purified by Phenol-chloroform-isoamyl alcohol extraction (twice) followed by chloroform extraction, then supplemented with 1/10 of volume of 3M Sodium Acetate pH 5 and 1.5 µl of Glycogen and precipitated with 2 volumes of 100% Ethanol at −80° C. for >1 hour. Followed 30 minutes centrifuge at 16000 g, pellet were washed with 75% ethanol, air dried and dissolved in 45 µl H2O.

Libraries were generated following a gel-free protocol using AMPure XP beads (Beckman Coulter) for all the purification and size selection steps. 10 ng or less of DNA were end repaired using End-it DNA end repair (Epicentre), then A-tailed using Klenow Fragment (3'→5' exo-NEB) followed by adapter-barcode ligation using T4 DNA ligase (Enzymatics). Illumina compatible adapter-barcodes were purchased from BIOO scientific. After ligation, DNAs were negatively size selected using 0.5× Ampure XP beads and unbound DNAs were positively size selected by adding 0.4× Ampure XP beads (this step allows for retention of DNA fragments ranging 200-500 bp). Libraries were amplified using Phusion High Fidelity PCR master mix 2× (NEB) with a 16 cycles program. Purified libraries were then submitted to quantification, quality control and sequencing. Libraries were pooled and sequenced on a lane of Single-End run on a HiSeq2500 operated at High Output mode (Illumina). The sequencer outputs were processed using the Galaxy platform (Goecks et al., 2010) available at the Minnesota Supercomputing Institute (MSI). Demultiplexing assigned ~60 million reads across the 2 samples (~30 million reads per sample). Each sample's reads were then aligned to the human genome (hg38) using Bowtie2 (Langmead and Salzberg 2012) followed by removal of PCR duplicates using the SAM tool rmdup 1.0.1 (Li H et al, 2009). Peak calling was performed using MACS 1.0.1 (Zhang et al 2008) (parameters: -s 51-bw 300, -p 1e−05-m 32). Bigwig files for visualization on IGV (Thorvaldsdóttir H et al, 2013) were generated by converting the wig files obtained from MACS using the Galaxy tool Wig-to-BigWig. Motif analysis was performed using the SeqPos tool. For this analysis the Top 3000 PAX7 peaks (based on the MACS score) were filtered to exclude regions overlapping peaks detected in the Input and the human blacklist dataset. Annotation of PAX7 peaks was performed using the web resource PAVIS.

Transplantation Studies.

Both tibialis anterior (TA) muscles of 6-8 weeks old male NOD-scid IL2Rgnull (NSG) mice (Jackson lab) were pre-injured with 15 µl of cardiotoxin 10 µM (Latoxan). 24 hrs after cardiotoxin, cells were collected at approximately 60-80% cell density using Enzyme-free cell dissociation buffer (Gibco), then washed with PBS and resuspended in PBS supplemented with 10 ng/ml bFGF at the concentration of $5*10^5$ cells/10 µl. Cells were injected in one TA per mouse while the contralateral TA received the same volume of PBS as internal control. 6 to 8 weeks after transplantation, mice were euthanized and TAs collected for immunostaining analysis as previously described (Darabi et al., 2008). Briefly, muscles were frozen in isopentane cooled in liquid nitrogen, and serial 10 µm-thick cryosections were collected.

Immunostaining.

Cultured cells were fixed with 4% PFA for 10 min at +4° C. followed by permeabilization with 0.1% Triton in PBS for 10 min at RT. After PBS wash, cells were blocked for 30 min at RT with 3% BSA in PBS and then incubated with primary antibodies diluted in blocking solution overnight at +4° C. Cells were then washed and incubated with secondary antibody diluted in blocking solution supplemented with DAPI for 1 hour at RT. After PBS washes, cells were maintained in PBS until final analysis. Pictures were acquired using an inverted fluorescence microscope (Zeiss). Tissue cryosections were permeabilized with 0.3% Triton X-100 in PBS for 20 min at RT, then blocked and incubated with anti-Dystrophin primary antibodies overnight as described. Sections were then incubated for 1 hr at RT with the anti-Lamin A/C antibody, followed by washes and secondary antibodies incubation as described for cells. Antibodies: Myosin Heavy Chain (clone MF20—Developmental Studies Hybridoma Bank); Myogenin (clone F5D MF20—Developmental Studies Hybridoma Bank); human specific Lamin A/C (Abcam); human specific Dystrophin (EMD Millipore); OCT3/4, NANOG and SOX2 (all from Santa Cruz Biotechnology); Alexa-555 goat anti-mouse and Alexa-488 goat anti-rabbit (Thermo Fisher). Detailed information for the antibodies is provided in Table 1.

Quantification and Statistical Analysis.

Analyses were performed using the ImageJ distribution Fiji (Schindelin et al., 2012). Quantification of in vivo engraftment was performed by counting the number of hLMNA-C positive fibers in 4 representative pictures for each transplanted mouse using the plugin Cell counter. Data represent mean+standard error of n=3 independent transplanted muscles. Analysis of myogenic differentiation potential of sorted subfractions was performed as follow: color channels were separated and threshold level for the red and blue channels were adjusted in order to select the area positive respectively to MYHC (red) and DAPI (blue). The area positive for each channel was analyzed using Analyze Particle using 0-Infinity as Size parameter. Finally, the percentage of MYHC+ area for each image was normalized based on nuclear staining (DAPI+). Data represent mean+ standard deviation of at least 2 representative pictures for each independent experiments (n=3).

Results

Identification of PAX7-Induced Transcriptional Changes During Human Myogenesis

Figure 1:
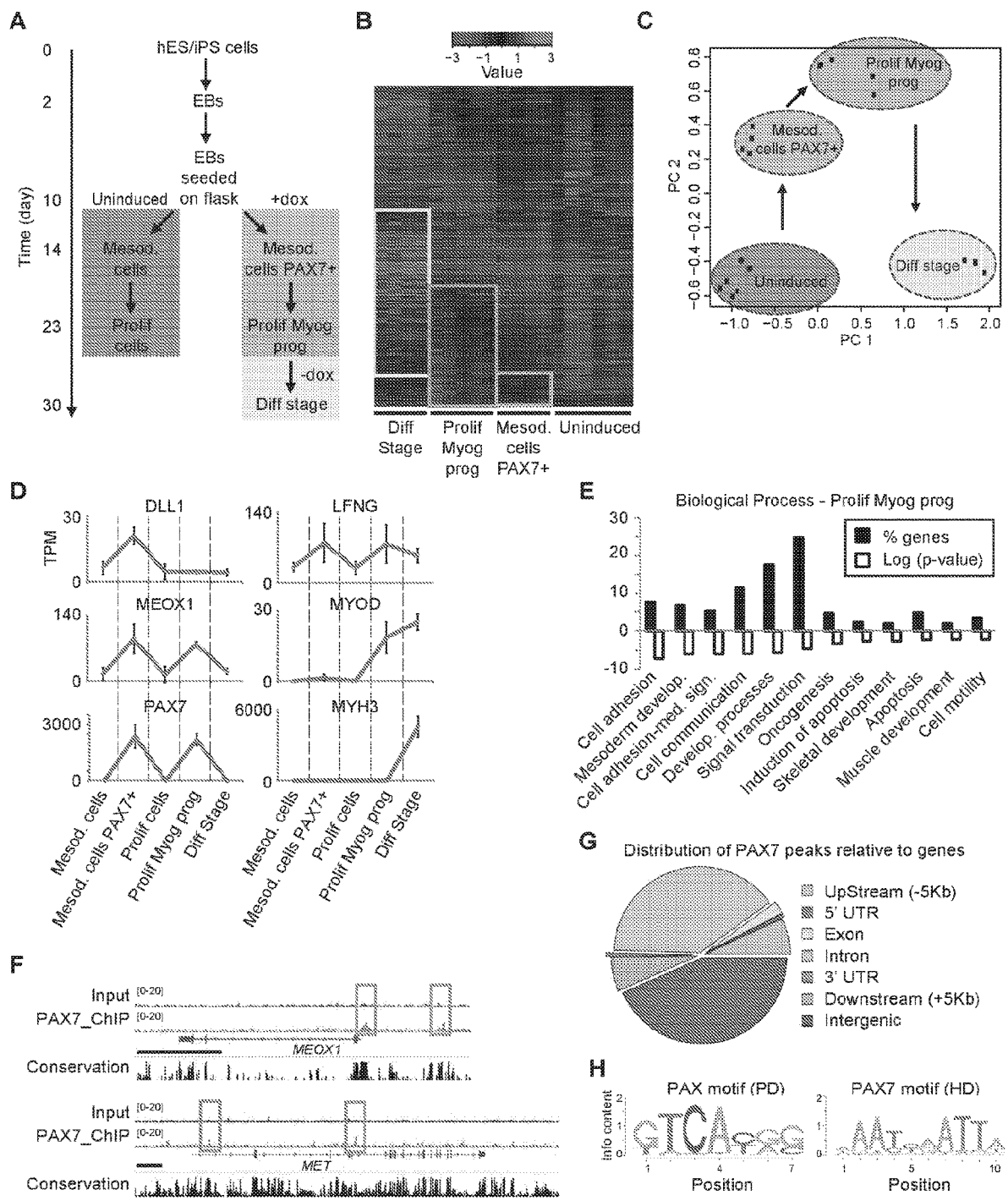
FIGS. 1A-G: Identification of gene expression changes during human skeletal myogenesis. A) Schematic representation of the skeletal myogenic differentiation protocol of human pluripotent stem cells using inducible PAX7 expression. Samples were collected at day 14 (uninduced mesodermal cells and mesodermal cells PAX7+), day 23 (uninduced proliferating cells and dox-treated GFP+ cells, also referred as proliferating myogenic progenitors) and day 30 Day 14 sorted (differentiation stage—7 days post-dox withdrawal). B) Heat map representing differentially expressed transcripts between control and PAX7-induced differentiating human pluripotent stem cells. C) Principal component analysis of differentially expressed genes identified by RNA-seq. D) Expression profiles of selected genes from RNA-seq. TPM: Transcripts Per Million. E) Gene Ontology classification of up-regulated genes based on Biological Process performed using DAVID web resource. Histogram reports % genes and log (p-value) (shown on the negative y axis). F) Snapshot of tracks from the Integrative Genome Viewer (IGV) browser showing PAX7 peaks (green boxes) at the MEOX1 and MET loci. Conservation (Phastcons scale 0-1). Bar: 10 Kb. G) Distribution of PAX7 peaks relative to genes following annotation using PAVIS web resource. H) Enriched motifs identified at the PAX7 ChIP-seq peaks.
Figure 6:
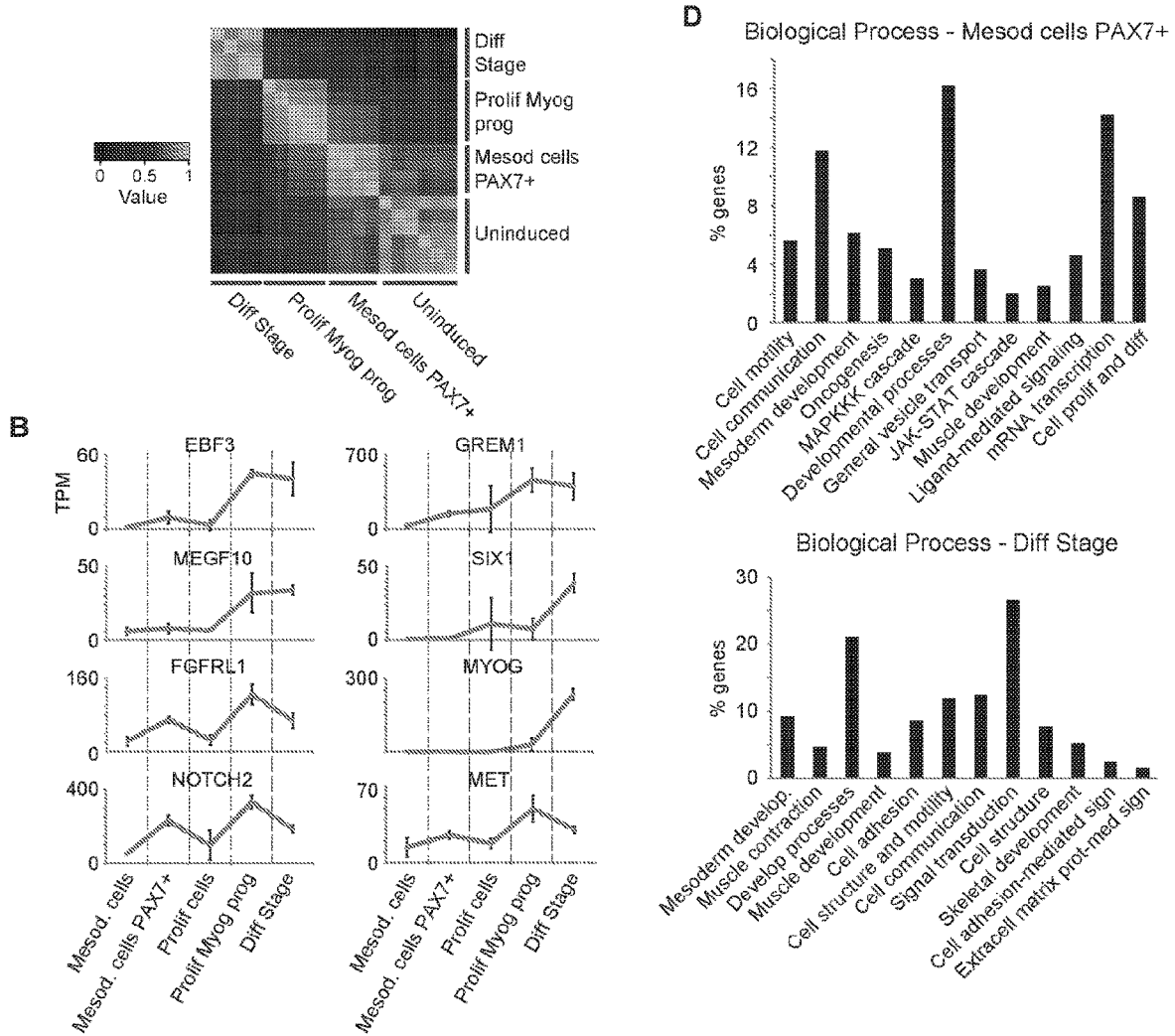
Figure 6:
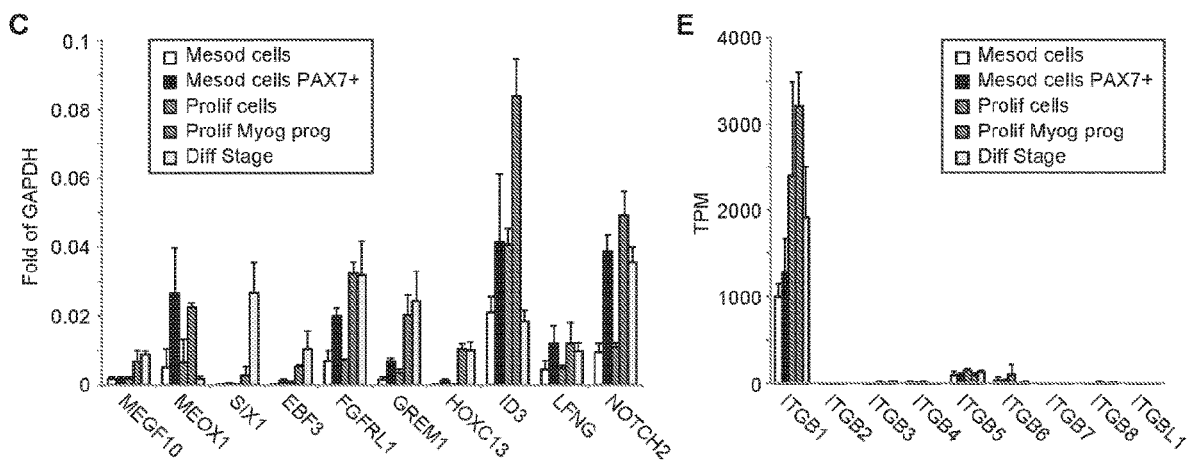

Controlled expression of PAX7 in differentiating human ES/iPS cells results in the specification of a highly proliferative population of myogenic progenitors with robust regenerative potential in vivo. However in order for this approach to be suitable for clinical translation, strategies for the purification of these myogenic progenitors not relying on the use of potentially immunogenic intracellular reporters (e.g. GFP), but rather specific surface markers that are compatible with clinical-grade purification methods, are desired. To address this, a systematic analysis was performed to identify the gene expression changes induced by PAX7 during the commitment of the skeletal myogenic lineage from human PS cells in vitro. As schematized in FIG. 1A, the following time points were focused on: Mesodermal cells PAX7+(day 14), Proliferating Myogenic progenitors (approximately day 23), and differentiated myocytes (Diff stage—around day 30; 7 days in the absence of PAX7 induction). Since PAX7 expression is doxycycline inducible, uninduced control samples were also collected at the same time points (termed Mesodermal cells and Proliferating cells). RNA-sequencing (RNA-seq) identified about 2000 genes whose expression levels displayed a fold change >4 and TPM (Transcript Per Million reads) >64 in at least one of the replicates (FIG. 1B). Unsupervised analysis of these differentially expressed genes identified 4 distinct clusters representing cells undergoing PAX7-dependent myogenic commitment (Mesod cells PAX7+, Prolif Myog prog and Diff stage) and uninduced cells (FIG. 1B). Based on principal component analysis (PCA), these clusters were separated based on PAX7 expression (dox-treated cells—on PC2 axis) and progression toward the differentiated skeletal myogenic state (on PC1 axis) (FIG. 1C). As evidenced by the heat map in FIG. 1B and Spearman correlations map in FIG. 6A, gene expression changes follow a pattern suggesting the gradual activation of the skeletal myogenic program induced by PAX7, which is also discernible at the single gene level (FIG. 1D and FIG. 6B). Notably, genes associated with paraxial mesoderm development such as DLL1, MEOX1 and LFNG seems to depend upon PAX7 expression, indicative of the ability of this transcription factor to induce a population of mesodermal progenitors which will undergo myogenic commitment (FIG. 1D). After validating selected candidates by qRT-PCR (FIG. 6C), the genes up-regulated in each cluster were functionally annotated (FIG. 1B). This analysis revealed that each cluster is characterized by up-regulated genes with distinct biological function based on Gene Ontology (GO) classification (FIG. 1E and FIG. 6C). While both Mesodermal cells PAX7+ and Proliferating Myogenic progenitors are enriched for genes involved in cell motility/adhesion and communication, the terminal differentiation stage is characterized by the expression of genes involved in terminal differentiation (FIG. 1E and FIG. 6D). To gain further insights about the PAX7-mediated activation of the skeletal myogenic program, Chromatin-immunoprecipitation followed by sequencing (ChIP-seq) for PAX7 in Proliferating Myogenic progenitors was also performed. Putative PAX7 binding sites were identified in several differentially regulated genes (approximately 50%), including MEOX1, MET, MYF5 and MYOD (FIG. 1F and FIG. 7A). Following annotation, PAX7 peaks are located within Introns and in Intergenic regions (FIG. 1G), while the gene type distribution highlighted the preference for protein-coding genes and long non-coding RNAs (FIG. 7B). Analysis of the top 3000 peaks evidenced the enrichment of both the PAX (Paired-domain dependent) and the PAX7 (homeo-domain dependent) motifs (FIG. 1H), demonstrating the specificity of the approach in identifying bonafide PAX7 binding sites. Collectively, all these data represent the first detailed analysis of PAX7 function during human skeletal myogenesis and allows one to interrogate specific questions, such as the molecular identity of the myogenic progenitors endowed with muscle regenerative potential.

Figure 2:
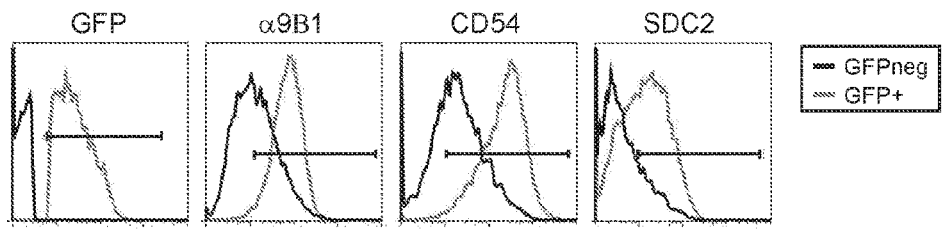
Figure 2:
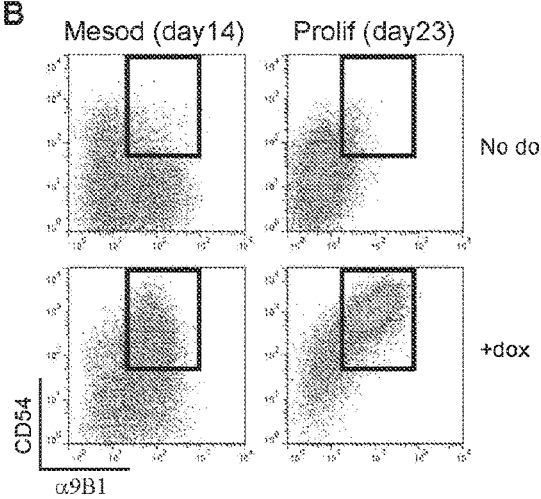
Figure 2:
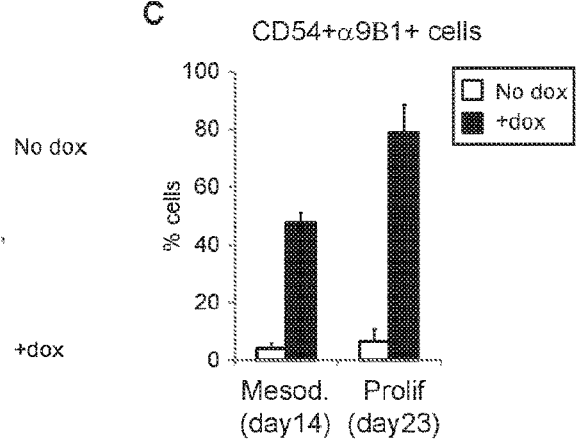
Figure 2:
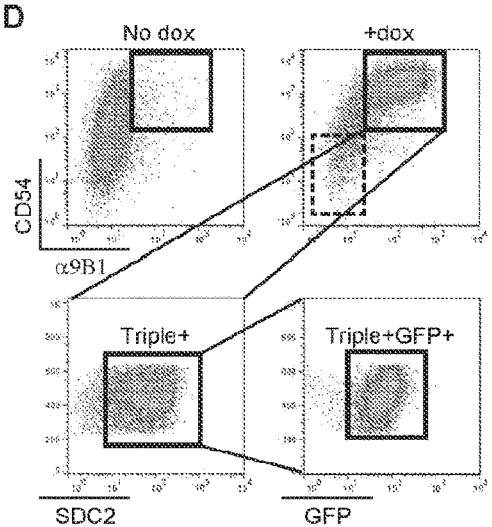
Figure 2:
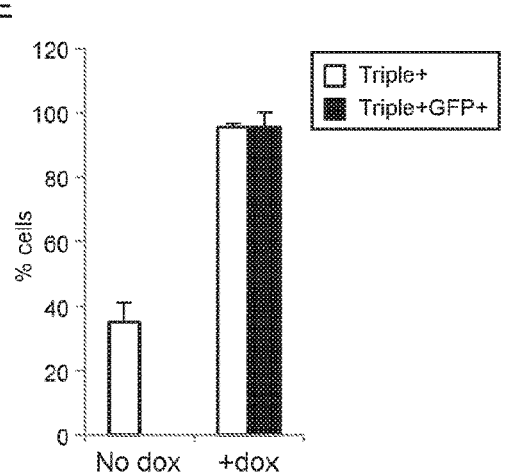
Figure 2:
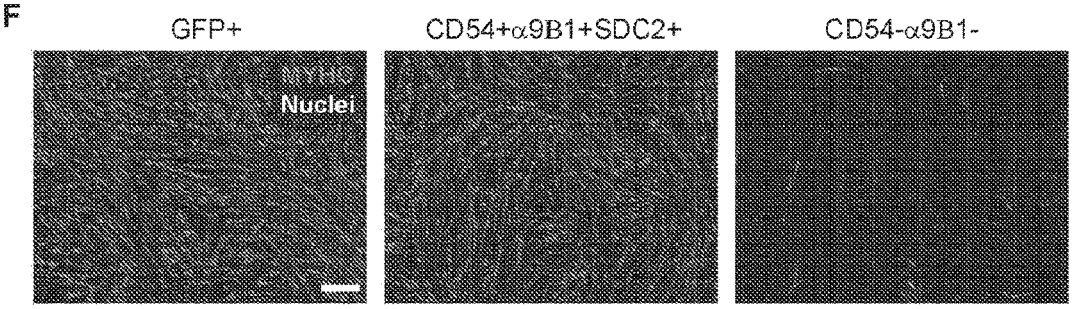
Figure 3:
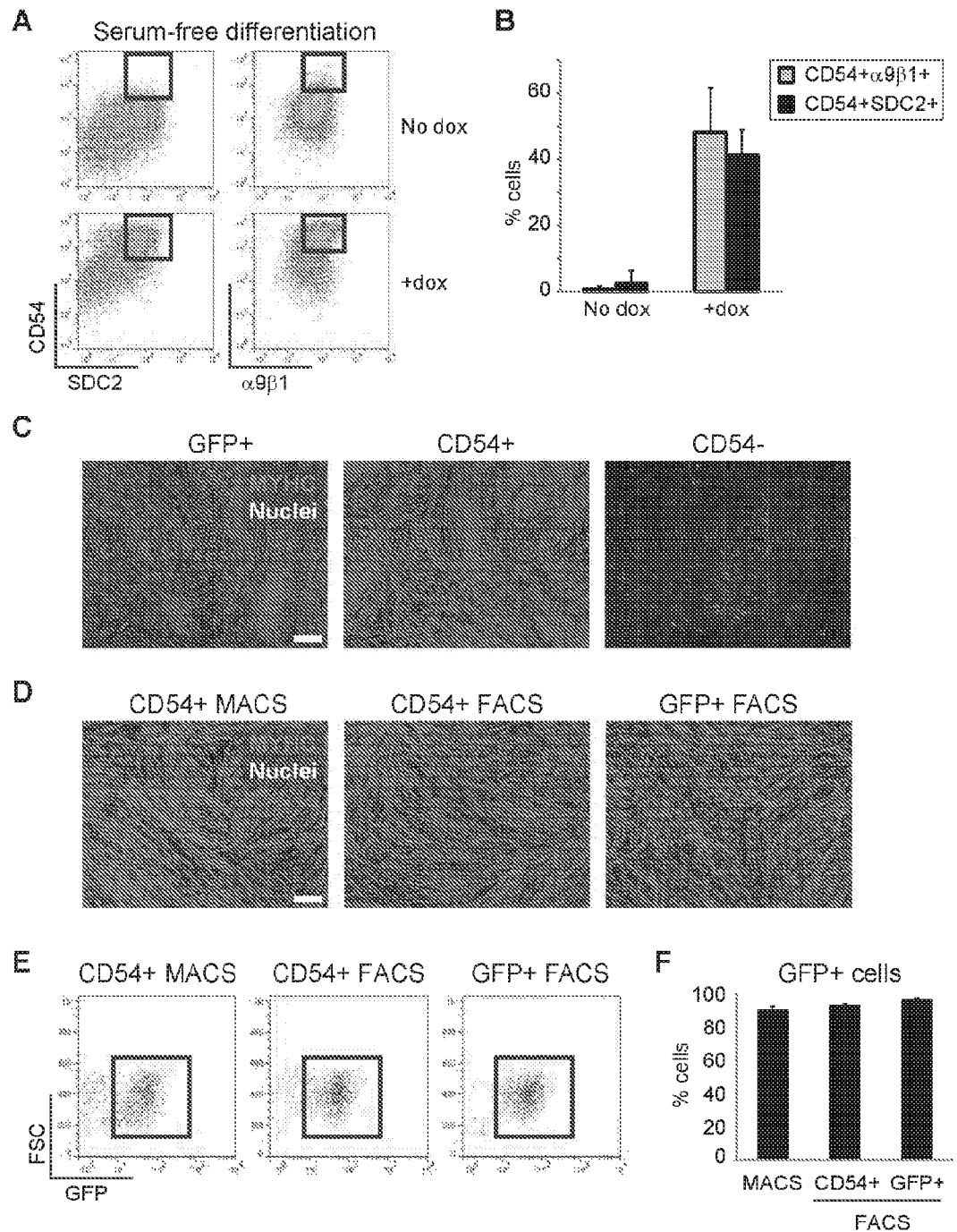
Figure 8:
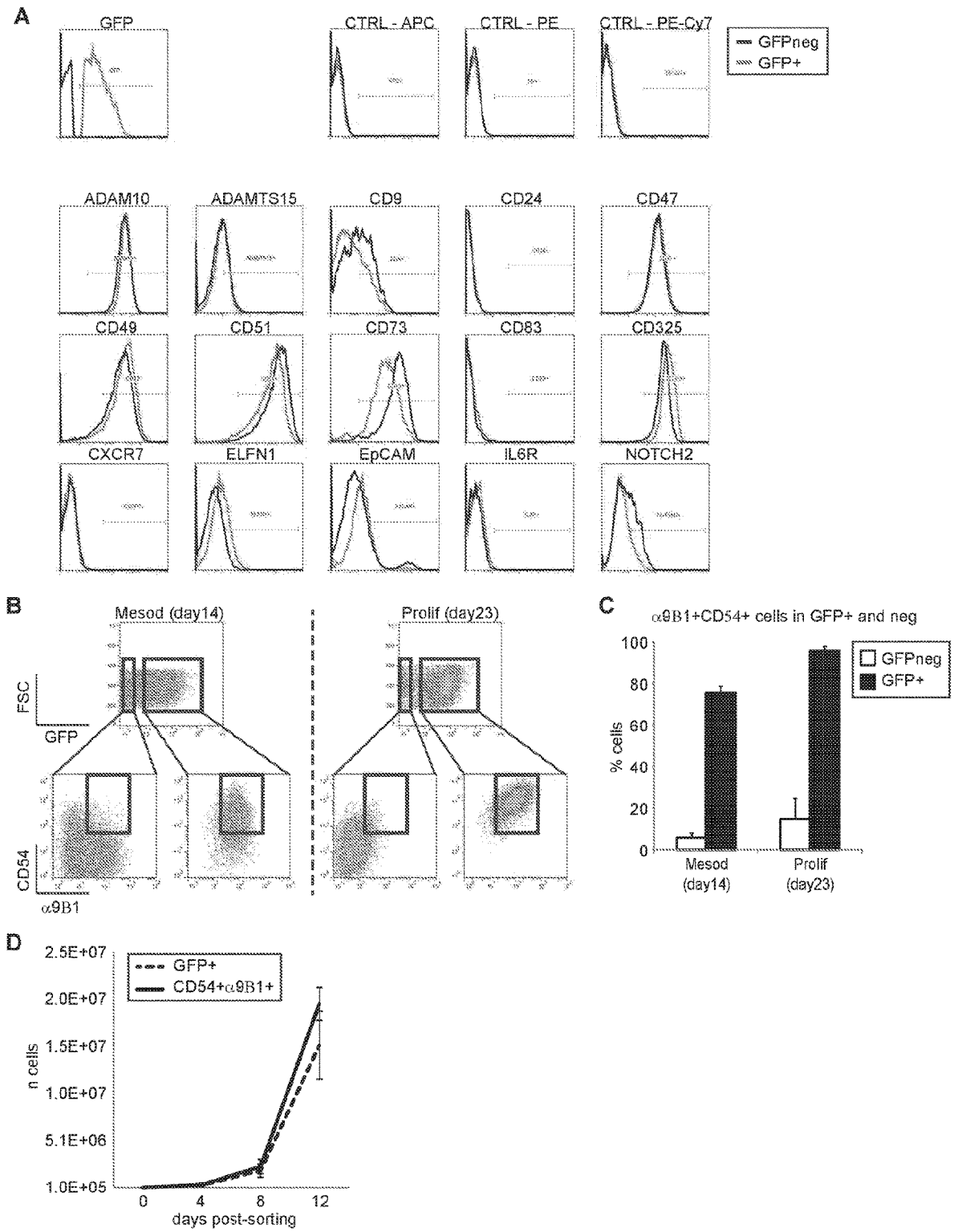

Next, the identification of candidate surface markers specific for cells undergoing PAX7-dependent myogenic commitment was determined. GO analysis identified a group of 50 genes associated with cell adhesion, which are up-regulated following PAX7 expression (Table 2) in Mesodermal cells PAX7+ and Proliferating Myogenic progenitors. Although measuring gene expression levels is important for studying cellular processes, RNA molecules are subjected to post-transcriptional regulation and protein expression might not reflect such variations. Therefore, using available commercial antibodies, several candidate surface markers were screened to identify changes in protein expression levels between Mesodermal cells PAX7+ (identified based on GFP expression, which is encoded by the bicistronic transcript PAX7-ires-GFP) and control uninduced cells (PAX7-negative). As shown in FIG. 2A and FIG. 8A, FACS analysis confirmed distinct up-regulation of 3 surface markers following PAX7 induction (compare GFP+ and GFPneg cells). These surface markers include the Intercellular Adhesion Molecule 1 (ICAM1 or CD54), Syndecan 2 (SDC2), and Alpha9 Integrin (ITGA9) subunit. As Integrin B 1 is the main beta integrin subunit expressed in these cells (FIG. 6E), the expression of ITGA9 was studied using the antibody for the a9ß1 dimer.

TABLE 2

Genes in BP00124: Cell adhesion
List of genes associated with cell adhesion, which were found up-regulated following PAX7 induction in PAX7+ proliferating myogenic progenitors.

| GENE_SYMBOL | GENE NAME |
|---|---|
| ASAPI | ArfGAP with SH3 domain, ankyrin repeat and PH domain 1 |
| CD151 | CD151 molecule (Raph blood group) |
| CD47 | CD47 molecule |
| CDON | Cdon homolog (mouse) |
| FAT1 | FAT tumor suppressor homolog 1 (*Drosophila*) |
| FAT4 | FAT tumor suppressor homolog 4 (*Drosophila*) |
| GIT2 | G protein-coupled receptor kinase interacting ArfGAP 2 |
| ARHGEF12 | Rho guanine nucleotide exchange factor (GEF) 12 |
| ROCK2 | Rho-associated, coiled-coil containing protein kinase 2 |
| ARVCF | armadillo repeat gene deletes in velocardiofacial syndrome |
| ATRNL1 | attractin-like 1 |
| CDH15 | cadherin 15, type 1, M-cadherin (myotubule) |
| CDH2 | cadherin 2, type 1, N-cadherin (neuronal) |
| CLSTN3 | calsyntenin 3 |
| CERCAM | cerebral endothelial cell adhesion molecule |
| COL2A1 | collagen, type II, alpha 1 |
| COL4A2 | collagen, type IV, alpha 2 |
| COL5A2 | collagen, type V, alpha 2 |
| GPC1 | glypican 1 |
| GPC4 | glypican 4 |
| HSPG2 | heparan sulfate proteoglycan 2 |
| ITGA1 | integrin, alpha 1 |
| ITGA5 | integrin, alpha 5 (fibronectin receptor, alpha polypeptide) |
| ITGAV | integrin, alpha V (vitronectin receptor, alpha polypeptide, antigen CD51) |
| ICAM1 | intercellular adhesion molecule 1 |
| JAM2 | junctional adhesion molecule 2 |
| KIRREL | kin of IRRE like (*Drosophila*) |
| LAMA4 | laminin, alpha 4 |
| LRRC4B | leucine rich repeat containing 4B |
| LOX | lysyl oxidase |
| LOXL1 | lysyl oxidase-like 1 |
| LOXL2 | lysyl oxidase-like 2 |
| MXRA5 | matrix-remodelling associated 5 |
| MAGED1 | melanoma antigen family D, 1 |
| MAGED2 | melanoma antigen family D, 2 |
| NCAM1 | neural cell adhesion molecule 1 |
| NRCAM | neuronal cell adhesion molecule |
| NID1 | nidogen 1 |
| PCDH7 | protocadherin 7 |
| PCDHA10 | protocadherin alpha 13; protocadherin alpha 10; protocadherin alpha subfamily C, 1; protocadherin alpha subfamily C, 2 |
| PCDHB2 | protocadherin beta 2 |
| PCDHGA11 | protocadherin gamma subfamily A, 11 |
| PCDHGB4 | protocadherin gamma subfamily B, 4 |
| PCDHGB7 | protocadherin gamma subfamily B, 7 |
| PCDHGC3 | protocadherin gamma subfamily C, 3; protocadherin gamma subfamily C, 5; protocadherin gamma subfamily C, 4; protocadherin gamma subfamily A, 12 |
| SDC2 | syndecan 2 |
| SDC3 | syndecan 3 |
| TNS3 | tensin 3 |
| TSPAN9 | tetraspanin 9 |
| TRO | trophinin |

Figure 9:
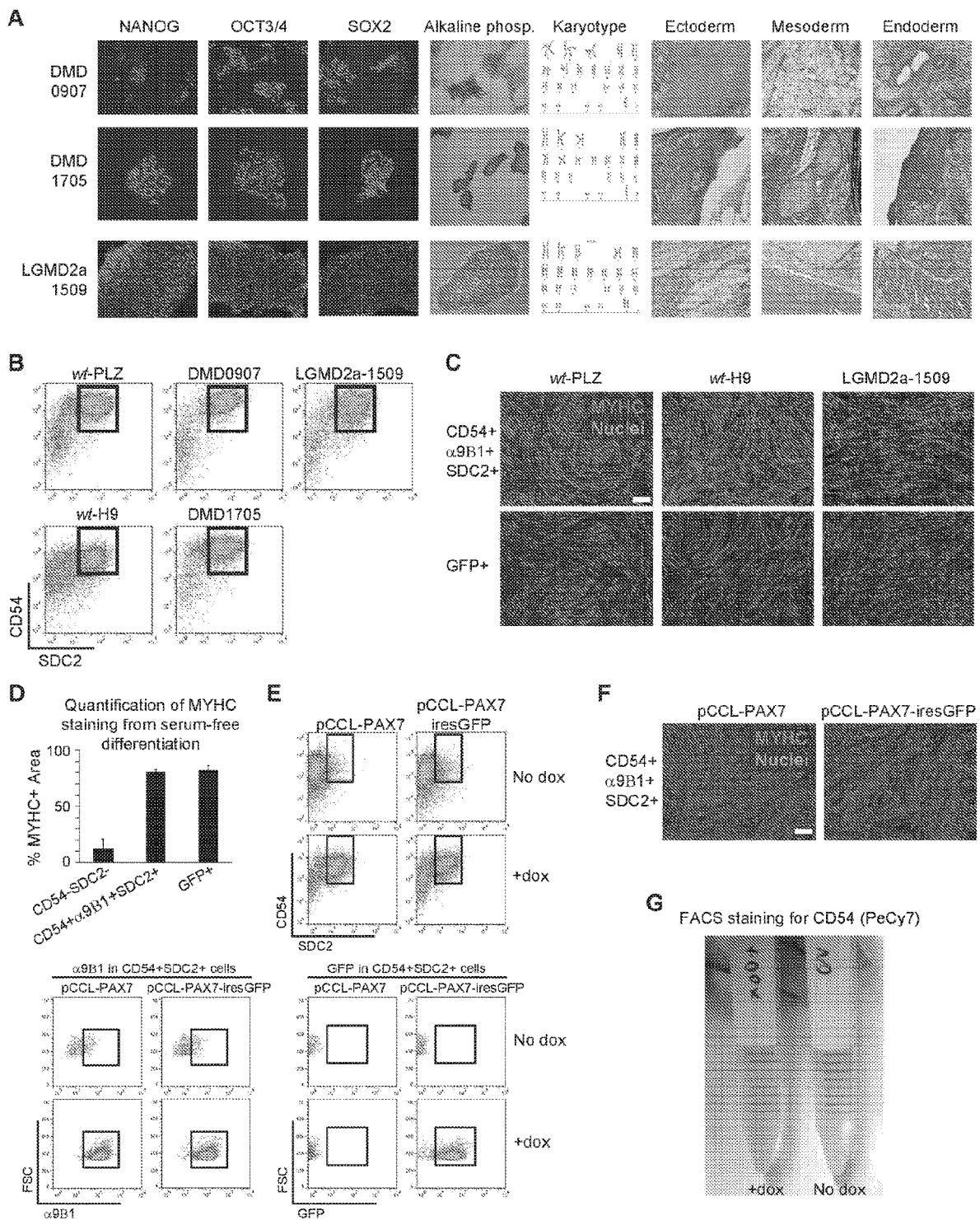

Since RNA-seq showed a time dependent change in gene expression during the PAX7-mediated myogenic commitment, the expression of these markers was evaluated over time. Following PAX7 induction, a population of CD54+ (bright) cells was detected in Mesodermal cells PAX7+ (day 14—FIG. 2B). This population is also positive for α9β1 integrin, and becomes clearly distinct from the control cultures (no dox) in the Proliferating Myogenic progenitor stage (day 23—FIG. 2B). Quantification of the frequency of these populations confirmed the up-regulation of these surface markers upon PAX7 induction (FIG. 2C). Similar results were obtained when cells are analyzed based on PAX7 expression using the GFP reporter (GFP+ vs. GFP-neg) (FIG. 8B-C). Not surprisingly, upon inspection of the ChIP-seq data, PAX7 binding was identified at the 5' region of CD54 (ICAM1) and in the intronic region of SDC2 (FIG. 7A), which strongly supports the role of PAX7 in the direct regulation of these genes. Because the PAX7+ population positive for these markers is clearly separated from the negative population at the Proliferating Myogenic progenitor stage (day 23—FIG. 2B), purification efforts were focused at this specific time point. Notably, in Proliferating Myogenic progenitors, CD54+α9β1+ cells are ~95% SDC2+(Triple+; FIG. 2D-E), and retrospective analysis of GFP expression shows that Triple+ cells are nearly 100% GFP+(FIG. 2D-E), thus suggesting that these markers can replace the GFP transgene for the purification of human pluripotent-derived PAX7+ myogenic progenitors. To confirm this, FACS-purification of both CD54+α9β1+SDC2+ (Triple+) and CD54- α9β1- fractions at >95% purity was undertaken (data not shown), and their ability to generate Myosin Heavy Chain positive (MYHC+) skeletal myocytes in vitro was assessed. Remarkably, indistinguishable MYHC+ terminal differentiation was observed between the CD54+α9β1+SDC2+ fraction and the control GFP+ (PAX7+) cell population (FIG. 2F). In contrast, CD54-α9β1- cells showed virtually no myogenic potential as denoted by the extremely low number of MYHC positive cells (FIG. 2F). Both GFP+ and CD54+α9β1+SDC2+ sorted cells displayed same proliferative potential (FIG. 8D) and these surface markers are detected upon PAX7 expression in several differentiating pluripotent stem cell lines (FIGS. 9A and C), and consistently purify myogenic progenitors with robust skeletal myogenic differentiation potential (FIG. 9B). These data clearly demonstrate that isolation of human pluripotent stem cell-derived PAX7+ myogenic progenitors can be achieved using CD54, α9β1 and SDC2.

Notably, it was observed that PAX7 is capable of inducing a population of CD54+Integrinα9β1+SDC2+ myogenic progenitors independently of the culture condition used (FIG. 3A-C). Upon PAX7 expression in pluripotent cells differentiating using a chemically defined differentiation protocol, CD54+α9β1+SDC2+ cells represent a defined population (FIG. 3A-B) endowed with high myogenic potential (FIG. 3C) and indistinguishable from cells sorted based on GFP expression.

As shown above, myogenic progenitors are homogeneously defined by the expression of CD54, α9β1 and SDC2. Nevertheless, because methods compatible with clinical applications generally involve the use of single marker purification by magnetic beads, sequential purification of 3 surface markers may be inefficient for this goal. Considering the very high levels of CD54 expression levels in PAX7-induced cells (FIG. 2A), and that CD54high cells are also positive for both α9β1 and SDC2 (FIG. 2D), it determined whether CD54 could be used as a single marker for the isolation of myogenic progenitors. For this, CD54-labeled human myogenic progenitors were isolated using either FACS or Magnetic cell sorting (MACS). Both methods produced a population of myogenic progenitors characterized by robust myogenic differentiation, comparable to GFP+ (PAX7+) control cell population (FIG. 3D). Retrospective analysis of GFP expression revealed that both CD54 FACS- and MACS-purified cells are highly enriched for GFP (FIG. 3E-F), and demonstrates that a single step purification strategy can provide cultures with optimal enrichment of human pluripotent-derived PAX7+ proliferating myogenic progenitors.

One concern with potential cell therapies involving pluripotent stem cell-derived cultures is the presence of contaminating undifferentiated pluripotent cells that might be teratogenic. It was investigated whether the cell fraction negative for the aforementioned newly identified markers displayed pluripotency features. Characterization of FACS-purified CD54–α9β1–SDC2– cells cultured in pluripotent stem cell medium revealed that negative cells are not able to form human pluripotent stem cell-like colonies (FIG. 9D), and consistently, lack expression of the pluripotency markers OCT3/4, SOX2 and NANOG (FIG. 9E).

A fundamental requirement for cell therapy is the demonstration of in vivo regeneration potential using animal models. ES/iPS-derived myogenic progenitors efficiently participate in muscle regeneration by producing fibers positive to both human DYSTROPHIN (hDYS) and human LAMIN A/C. To assess whether human myogenic progenitors isolated using these newly identified surface markers have the same regeneration potential as the GFP+ control counterparts, CD54+α9β1+SDC2+ sorted myogenic progenitors were injected in the cardiotoxin-injured Tibialis Anterior (TA) muscles of immunodeficient (NSG) mice. As shown in FIG. 4A, compared to PBS-injected control, myogenic progenitors purified based on the expression of CD54, α9β1 and SDC2 displayed robust regenerative potential, evidenced by the presence of hDYS+:hLAMIN A/C+ fibers. The regenerative potential of CD54+cα9β1+SDC2+ sorted myogenic progenitors is equivalent to that observed with the GFP+(PAX7+) control cell population, thus evidencing the application of this purification strategy for the therapeutic-compatible production of human pluripotent stem cell-derived myogenic progenitors.

Discussion

Figure 4:
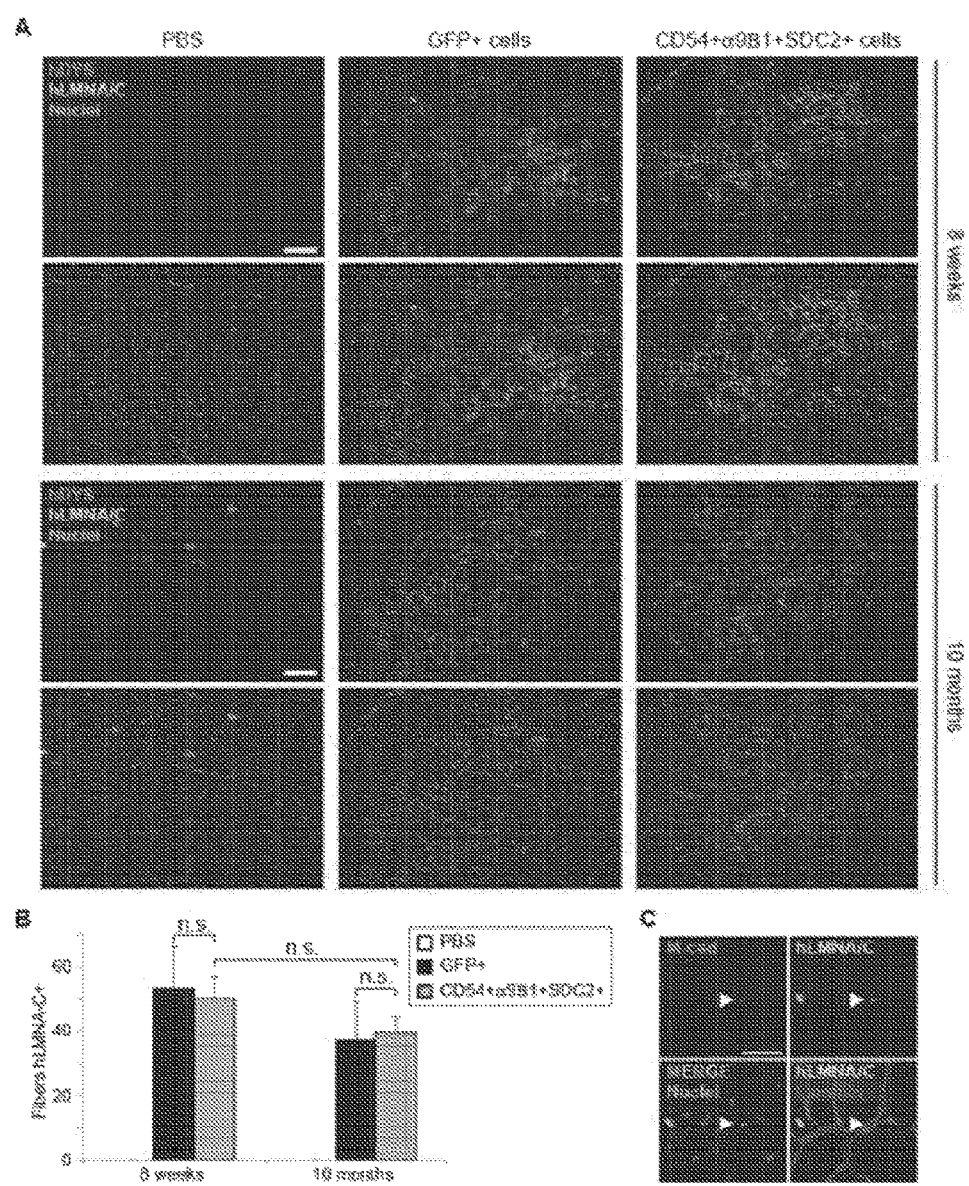

Since the isolation of human ES cells, regenerative medicine has attracted many interests (from both academia and industries) which promoted the rapid expansion of this field and, among the various achievements, resulted in the development of the iPS cell technology. Methods for the isolation of the target population represent one issue for the clinical application of pluripotent stem cell-derived stem cell products and their development entails a detailed characterization of the ES differentiation process. In the case of skeletal myogenesis, it has been demonstrated that PAX7 expression in differentiating pluripotent stem cells allows for the derivation of myogenic progenitors able to restore muscle function. Described herein is the investigation of the process leading to the specification of the skeletal myogenic lineage through RNA- and Chromatin-immunoprecipitation sequencing. These analyses revealed a group of differentially expressed genes accounting for the unbiased separation of the samples into four independent clusters and whose localization on the PCA graph is reminiscent of the time-dependent commitment toward the skeletal myogenic lineage (FIGS. 1B and C). Furthermore, many up-regulated genes contains putative PAX7 binding sites (FIG. 1F and FIG. 7A) and upon functional classification of these data, it was observed that genes involved in cell adhesion and motility represent the most significant category up-regulated by PAX7 (FIG. 1E). Taking advantage of this knowledge, a screening was performed to identify markers enriched on the surface of pluripotent stem cell-derived myogenic progenitors (FIG. 2A-B and FIG. 8A-B) and then it was demonstrated that CD54, α9β1 integrin and Syndecan 2 allows for the isolation of these progenitors from cultures of differentiating pluripotent stem cells (FIGS. 2C-E and 3A-C). Cells isolated based on the expression of these newly identified markers are indistinguishable from the ones sorted using intracellular reporters and are endowed with high in vitro proliferative potential and in vivo regenerative capacity (FIGS. 4 and 8D).

Beside other cell populations which are currently being tested in clinical trials such as mesongioblasts and CD 133+ cells, other investigators have reported methods for the isolation of pluripotent stem cell-derived myogenic progenitors, although the data produced so far are not sufficient for justifying their application in regenerative medicine. Myogenic cells produced by small-molecule mediated differentiation of ES/iPS cells has demonstrated to be efficient for in vitro differentiation, but their engraftment capability was very limited or only displayed several undifferentiated cells in the interstitium, suggesting the possibility that non-myogenic undifferentiated cells might be present in the cell preparation. Moreover, based on MYOGENIN expression, these pluripotent stem cell-derived myogenic cells resemble myoblasts, a population already tested in several trials which did not provide beneficial improvements. In contrast, the differentiation protocol described herein produces a population that homogeneously produces myogenic progenitors capable of skeletal muscle regeneration, which represent a key aspect for safe and efficient cell therapy of muscle disease.

The surface markers provided herein provide for the large scale GMP-compatible production of pluripotent-derived myogenic progenitors which will ultimately contribute to the clinical translation of this cell population.

BIBLIOGRAPHY

Aiuti, A., et al. (2013). Lentiviral hematopoietic stem cell gene therapy in patients with Wiskott-Aldrich syndrome. Science 341, 1233151.

Ansari, A. M., et al. (2016). Cellular GFP toxicity and immunogenicity: potential confounders in in vivo cell tracking experiments. Stem Cell Rev. 12, 553-559.

Arpke, R. W., et al. (2013). A new immuno-, dystrophin-deficient model, the NSG-mdx(4Cv) mouse, provides evidence for functional improvement following allogeneic satellite cell transplantation. Stem Cells 31, 1611-1620.

Bajard, L., et al. (2006). A novel genetic hierarchy functions during hypaxial myogenesis: Pax3 directly activates Myf5 in muscle progenitor cells in the limb. Genes Dev. 20, 2450-2464.

Bernet, J. D., et al. (2014). p38 MAPK signaling underlies a cell-autonomous loss of stem cell self-renewal in skeletal muscle of aged mice. Nat. Med. 20, 265-271.

Biffi, A., et al. (2013). Lentiviral hematopoietic stem cell gene therapy benefits metachromatic leukodystrophy. Science 341, 1233158.

Borchin, B., et al. (2013). Derivation and FACS-mediated purification of PAX3+/PAX7+ skeletal muscle precursors from human pluripotent stem cells. Stem Cell Reports 1, 620-631.

Carpenter, M. K., and Rao, M. S. (2015). Concise review: making and using clinically compliant pluripotent stem cell lines. Stem Cells Transl. Med. 4, 381-388.

Chal, J., et al. (2015). Differentiation of pluripotent stem cells to muscle fiber to model Duchenne muscular dystrophy. Nat. Biotechnol. 33, 962-969.

Chal, J., et al. (2016). Generation of human muscle fibers and satellite-like cells from human pluripotent stem cells in vitro. Nat. Protoc. 11, 1833-1850.

Choi, I. Y., et al. (2016). Concordant but varied phenotypes among Duchenne muscular dystrophy patient-specific myoblasts derived using a human iPSC-based model. Cell Rep. 15, 2301-2312.

Cooper, R. N., et al. (1999). In vivo satellite cell activation via Myf5 and MyoD in regenerating mouse skeletal muscle. J. Cell Sci. 112, 2895-2901.

Cosgrove, B. D., et al. (2014). Rejuvenation of the muscle stem cell population restores strength to injured aged muscles. Nat. Med. 20, 255-264.

Darabi, R., and Perlingeiro, R. C. (2016). Derivation of skeletal myogenic precursors from human pluripotent stem cells using conditional expression of PAX7. Methods Mol. Biol. 1357, 423-439.

Darabi, R., et al. (2008). Functional skeletal muscle regeneration from differentiating embryonic stem cells. Nat. Med. 14, 134-143.

Darabi, R., et al. (2011a). Functional myogenic engraftment from mouse iPS cells. Stem Cell Rev. 7, 948-957.

Darabi, R., et al. (2011b). Assessment of the myogenic stem cell compartment following transplantation of Pax3/Pax7-induced embryonic stem cell-derived progenitors. Stem Cells 29, 777-790.

Darabi, R., et al. (2012). Human ES- and iPS-derived myogenic progenitors restore dystrophin and improve contractility upon transplantation in dystrophic mice. Cell Stem Cell 10, 610-619.

DeKelver, R. C., et al. (2010). Functional genomics, proteomics, and regulatory DNA analysis in isogenic settings using zinc finger nuclease-driven transgenesis into a safe harbor locus in the human genome. Genome Res. 20, 1133-1142.

Donalies, M., et al. (1991). Expression of M-cadherin, a member of the cadherin multigene family, correlates with differentiation of skeletal muscle cells. Proc. Natl. Acad. Sci. USA 88, 8024-8028.

Dull, T., et al. (1998). A third-generation lentivirus vector with a conditional packaging system. J. Virol. 72, 8463-8471.

Dumont, N. A., et al. (2015). Intrinsic and extrinsic mechanisms regulating satellite cell function. Development 142, 1572-1581.

Emery, A. E. (2002). The muscular dystrophies. Lancet 359, 687-695.

Epstein, J. A., et al. (1996). Pax3 modulates expression of the c-Met receptor during limb muscle development. Proc. Natl. Acad. Sci. USA 93, 4213-4218.

Filareto, A., et al. (2012). Engraftment of ES-derived myogenic progenitors in a severe mouse model of muscular dystrophy. J. Stem Cell Res. Ther. 10, S 10-001.

Filareto, A., et al. (2013). An ex vivo gene therapy approach to treat muscular dystrophy using inducible pluripotent stem cells. Nat. Commun. 4, 1549.

Gilbert, P. M., et al. (2010). Substrate elasticity regulates skeletalmuscle stem cell self-renewal in culture. Science 329, 1078-1081.

Hockemeyer, D., et al. (2009). Efficient targeting of expressed and silent genes in human ESCs and iPSCs using zinc-finger nucleases. Nat. Biotechnol. 27, 851-857.

Huang, D. W., et al, (2009). Systematic and integrative analysis of large gene lists using DAVID bioinformatics resources. Nat. Protoc. 4, 44-57.

Huard, J., et al. (1991). Myoblast transplantation produced dystrophinpositive muscle fibres in a 16-year-old patient with Duchenne muscular dystrophy. Clin. Sci. 81, 287-288.

Irintchev, A., et al. (1994). Expression pattern of M-cadherin in normal, denervated, and regenerating mouse muscles. Dev. Dyn. 199, 326-337.

Kim, J., et al. (2017). Expansion and purification are critical for the therapeutic application of pluripotent stem cell-derived myogenic progenitors. Stem Cell Reports, Published online May 18, 2017. dx.doi.org/10.1016/j.stemcr.2017.04.022.

Loh, K. M., et al. (2016). Mapping the pairwise choices leading from pluripotency to human bone, heart, and other mesoderm cell types. Cell 166, 451-467.

Magli, A., et al. (2013). Functional dissection of Pax3 in paraxial mesoderm development and myogenesis. Stem Cells 31, 59-70.

Magli, A., et al. (2014). Pax3 and Tbx5 specify whether PDGFRa+ cells assume skeletal or cardiac muscle fate in differentiating embryonic stem cells. Stem Cells 32, 2072-2083.

Mendell, J. R., et al. (1995). Myoblast transfer in the treatment of Duchenne's muscular dystrophy. N. Engl. J. Med. 333, 832-838.

Mitchell, K. J., et al. (2010). Identification and characterization of a non-satellite cell muscle resident progenitor during postnatal development. Nat. Cell Biol. 12, 257-266.

Partridge, T. A., et al. (1989). Conversion of mdx myofibres from dystrophin-negative to -positive by injection of normal myoblasts. Nature 337, 176-179.

Partridge, T., et al. (1998). Is myoblast transplantation effective? Nat. Med. 4, 1208-1209.

Quarta, M., et al. (2016). An artificial niche preserves the quiescence of muscle stem cells and enhances their therapeutic efficacy. Nat. Biotechnol. 34, 752-759.

Romero, Z. et al. (2013). β-globin gene transfer to human bone marrow for sickle cell disease. J. Clin. Invest. 123, 3317-3330.

Sampaolesi, M., et al. (2003). Cell therapy of alpha-sarcoglycan null dystrophic mice through intraarterial delivery of mesoangioblasts. Science 301, 487-492.

Seale, P., et al. (2000). Pax7 is required for the specification of myogenic satellite cells. Cell 102, 777-786.

Shelton, M., et al. (2014). Derivation and expansion of PAX7-positive muscle progenitors from human and mouse embryonic stem cells. Stem Cell Reports 3, 516-529.

Soleimani, V. D. et al. (2012). Transcriptional dominance of Pax7 in adult myogenesis is due to high-affinity recognition of homeodomain motifs. Dev. Cell 22, 1208-1220.

Sousa-Victor, P. et al. (2014). Geriatric muscle stem cells switch reversible quiescence into senescence. Nature 506, 316-321.

Takahashi, K., and Yamanaka, S. (2006). Induction of pluripotent stem cells from mouse embryonic and adult fibroblast cultures by defined factors. Cell 126, 663-676.

Tedesco, F. S., and Cossu, G. (2012). Stem cell therapies for muscle disorders. Curr. Opin. Neurol. 25, 597-603.

Thomson, J. A., et al. (1998). Embryonic stem cell lines derived from human blastocysts. Science 282, 1145-1147.

Torrente, Y., et al. (2004). Human circulating AC133(+) stem cells restore dystrophin expression and ameliorate function in dystrophic skeletal muscle. J. Clin. Invest. 114, 182-195.

Tremblay, J. P., et al. (1993). Results of a triple blind clinical study of myoblast transplantations without immunosuppressive treatment in young boys with Duchenne muscular dystrophy. Cell Transplant. 2, 99-112.

Vilquin, J. T. (2005). Myoblast transplantation: clinical trials and perspectives. Mini-review. Acta Myol. 24, 119-127.

Xi, H., et al. (2017). In vivo human somitogenesis guides somite development from hPSCs. Cell Rep. 18, 1573-1585.

Xu, C., et al. (2013). A zebrafish embryo culture system defines factors that promote vertebrate myogenesis across species. Cell 155, 909-921.

Zufferey, R., et al. (1998). Self-inactivating lentivirus vector for safe and efficient in vivo gene delivery. J. Virol. 72, 9873-9880.

Bolger, A. M., et al. (2014). Trimmomatic: a flexible trimmer for Illumina sequence data. Bioinformatics 30, 2114-2120.

Boyer, L. A., et al. (2005). Core transcriptional regulatory circuitry in human embryonic stem cells. Cell 122, 947-956.

Consortium, E. P. (2012). An integrated encyclopedia of DNA elements in the human genome. Nature 489, 57-74.

Goecks, J., et al. (2010). Galaxy: a comprehensive approach for supporting accessible, reproducible, and transparent computational research in the life sciences. Genome Biol 11, R86.

Hou, Z., et al. (2015). A cost-effective RNA sequencing protocol for large-scale gene expression studies. Sci Rep 5, 9570.

Huang, W., et al. (2013). PAVIS: a tool for Peak Annotation and Visualization. Bioinformatics 29, 3097-3099.

Kim, D., et al. (2015). HISAT: a fast spliced aligner with low memory requirements. Nat Methods 12, 357-360.

Langmead, B., and Salzberg, S. L. (2012). Fast gapped-read alignment with Bowtie 2. Nat Methods 9, 357-359.

Langmead, B., et al. (2009). Ultrafast and memory-efficient alignment of short DNA sequences to the human genome. Genome Biol 10, R25.

Li, B., and Dewey, C. N. (2011). RSEM: accurate transcript quantification from RNA-Seq data with or without a reference genome. BMC Bioinformatics 12, 323.

Li, H., et al., (2009). The Sequence Alignment/Map format and SAMtools. Bioinformatics 25, 2078-2079.

Liu, T., et al. (2011). Cistrome: an integrative platform for transcriptional regulation studies. Genome Biol 12, R83.

Schindelin, J., et al. (2012). Fiji: an open-source platform for biological-image analysis. Nat Methods 9, 676-682.

Thorvaldsdottir, H., et al. (2013). Integrative Genomics Viewer (IGV): high-performance genomics data visualization and exploration. Brief Bioinform 14, 178-192.

Trapnell, C., et al. (2012). Differential gene and transcript expression analysis of RNA-seq experiments with TopHat and Cufflinks. Nat Protoc 7, 562-578.

Zhang, Y., et al. (2008). Model-based analysis of ChIP-Seq (MACS). Genome Biol 9, R137.

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A method for isolating myogenic progenitor cells, wherein said method comprises:
   (a) contacting isolated mammalian pluripotent stem cells comprising an exogenous nucleic acid sequence encoding PAX7 operably linked to an inducible promoter with myogenic differentiation medium and a compound that induces PAX7 expression such that myogenic progenitor cells that express CD54 are obtained;
   (b) separating the myogenic progenitor cells that express CD54 obtained in step (a); and
   (c) culturing myogenic progenitor cells that express CD54 separated in step (b).

2. The method of claim 1, wherein the pluripotent stem cells are induced pluripotent stem (iPS) cells.

3. The method of claim 1, wherein the separating contacting is performed using Fluorescent Activated Cell Sorting (FACS).

4. A method of treating injured or diseased muscle tissue in a mammal, the method comprising: administering the myogenic progenitor cells that express CD54 cultured in step (c) of claim 1 into injured or diseased muscle tissue of a mammal such that the muscle tissue is treated.

5. The method of claim 4, wherein the injured or diseased muscle tissue is a result of injury or overuse, a genetic disorder, cancer, inflammation, infection, or medical treatment.

6. The method of claim 1, wherein the pluripotent stem cells are embryonic stem cells.

7. The method of claim 1, wherein the separating is performed using magnetic sorting.

* * * * *